United States Patent [19]

Kato et al.

[11] Patent Number: 5,021,311

[45] Date of Patent: Jun. 4, 1991

[54] ELECTROPHOTOGRAPHIC PHOTORECEPTOR

[75] Inventors: Eiichi Kato; Kazuo Ishii, both of Shizuoka, Japan

[73] Assignee: Fuji Photo Film Co., Ltd., Kanagawa, Japan

[21] Appl. No.: 401,884

[22] Filed: Sep. 1, 1989

[30] Foreign Application Priority Data

Sep. 2, 1988 [JP] Japan .............................. 63-218590

[51] Int. Cl.$^5$ ......................... G03G 5/00; C08F 18/16

[52] U.S. Cl. ..................................... 430/96; 430/127; 526/326

[58] Field of Search ........................... 430/96; 526/326

[56] References Cited

U.S. PATENT DOCUMENTS

| | | | |
|---|---|---|---|
| 3,885,961 | 5/1975 | Kimura et al. | 430/96 |
| 4,239,677 | 12/1980 | Dieck | 525/439 |
| 4,749,981 | 7/1988 | Yui et al. | 338/225 |
| 4,818,654 | 4/1989 | Hiro et al. | 430/59 |
| 4,871,634 | 10/1989 | Limburg et al. | 430/79 |
| 4,871,638 | 10/1989 | Kato et al. | 430/96 |

FOREIGN PATENT DOCUMENTS

| | | | |
|---|---|---|---|
| 0768289 | 3/1971 | Belgium | 430/96 |
| 0217501 | 12/1983 | Japan . | |
| 0038751 | 3/1984 | Japan | 430/96 |
| 1293211 | 12/1986 | Japan | 526/326 |

*Primary Examiner*—Marion E. Mc Camish
*Assistant Examiner*—S. Crossan
*Attorney, Agent, or Firm*—Sughrue, Mion, Zinn, Macpeak & Seas

[57] ABSTRACT

An electrophotographic photoreceptor comprising a support having provided thereon at least one photoconductive layer containing at least an inorganic photoconductive substance and a binder resin, wherein said binder resin comprises at least one copolymer resin comprising a monofunctional macromonomer (M) and a monomer (A), said monofunctional macromonomer (M) having a weight average molecular weight of not more than $2\times10^4$ and containing at least one polymerization component represented by formula (II-a) or (II-b):

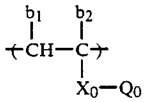

(II-a)

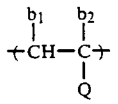

(II-b)

wherein $X_0$ represents —COO—, —OCO—, —$CH_2OCO$—, —$CH_2COO$—, —O—, —$SO_2$—, —CO—,

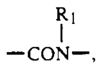

,
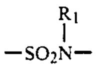
or

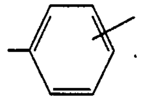

.

wherein $R_1$ represents a hydrogen atom or a hydrocarbon group; $Q_0$ represents an aliphatic group having from 1 to 18 carbon atoms or an aromatic group having from 6 to 12 carbon atoms, said carbon numbers not inclusive of substituents; $b_1$ and $b_2$, which may be the same or different, each represents a hydrogen atom, a halogen atom, a cyano group, a hydrocarbon group, —COO—Z or —COO—Z bonded via a hydrocarbon group, wherein Z represents a hydrogen atom or a substituted or unsubstituted hydrocarbon group; and Q represents —CN, —$CONH_2$ or

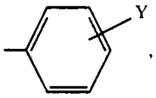

, wherein Y represents a hydrogen atom, a halogen atom, an alkoxyl group or —COOZ', wherein Z' represents an alkyl group, an aralkyl group or an aryl group, with a polymerizable double bond-containing group represented by formula (I) being bonded to only one of the terminals of the main chain of said macromonomer:

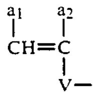

(I)

wherein V has the same meaning as $X_0$; and $a_1$ and $a_2$, which may be the same or different, each has the same meaning as $b_1$ and $b_2$, said monomer being (A) represented by formula (III):

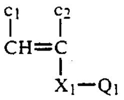

(III)

wherein $X_1$ has the same meaning as $X_0$; $Q_1$ has the same meaning as $Q_0$; and $c_1$ and $c_2$, which may be the same or different, has the same meaning as $b_1$ and $b_2$, and at least one polar group selected from —$PO_3H_2$, —$SO_3H$, —COOH, —OH, —SH, and

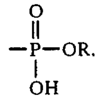

.

wherein R represents a hydrocarbon group, being bonded to only one of terminals of the main chain of said copolymer.

9 Claims, No Drawings

ELECTROPHOTOGRAPHIC PHOTORECEPTOR

FIELD OF THE INVENTION

This invention relates to an electrophotographic photoreceptor, and more particularly to an electrophotographic photoreceptor excellent in electrostatic characteristics and moisture resistance, and especially performance properties as a CPC photoreceptor.

BACKGROUND OF THE INVENTION

An electrophotographic photoreceptor may have various structures in agreement with prescribed characteristics or electrophotographic processes applied.

Widely employed among them is a system in which a photoreceptor comprises a support having provided thereon at least one photoconductive layer and, if necessary, an insulating layer on the surface thereof. The photoreceptor composed of a support and at least one photoconductive layer is subjected to ordinary electrophotographic processing for image formation including charging, imagewise exposure, development and, if necessary, transfer.

Electrophotographic photoreceptors have also been used widely as offset printing plate precursor for direct printing plate making. In particular, a direct electrophotographic lithographic printing system has recently been acquiring a greater importance as a system providing hundreds to thousands of prints of high image quality.

Binders to be used in the photoconductive layer should themselves have film-forming properties and capability of dispersing photoconductive particles therein, and, when, formulated into a photoconductive layer, binders should exhibit satisfactory adhesion to a support. They are also required to bear various electrostatic characteristics and image-forming properties, such that the photoconductive layer may exhibit excellent electrostatic capacity, small dark decay and large light decay, hardly undergo fatigue before exposure, and stably maintain these characteristics against change of humidity at the time of image formation.

Binder resins which have been conventionally used include silicone resins (see JP-B-34-6670, the term "JP-B" as used herein means an "examined published Japanese patent application"),styrene-butadiene resins (see JP-B35-1960), alkyd resins, maleic acid resins and polyamides (see Japanese JP-B-35-11219), vinyl acetate resins (see JP-B-41-2425), vinyl acetate copolymer resins (see JP-B41-2426), acrylic resins (see JP-B-35-11216), acrylic ester copolymer resins (see JP-B-35-11219, JP-B-36-8510, and JP-B-41-13946), etc. However, electrophotographic photosensitive materials using these known resins suffer from any of disadvantages, such as poor affinity for photoconductive particles (poor dispersion of a photoconductive coating composition); low charging properties of the photoconductive layer; poor quality of a reproduced image, particularly dot reproducibility or resolving power; susceptibility of reproduced image quality to influences from the environment at the time of electrophotographic image formation, such as a high temperature and high humidity condition or a low temperature and low humidity condition; and the like.

In order to improve electrostatic characteristics of a photoconductive layer, various proposals have hitherto been made. For example, it has been proposed to incorporate into a photoconductive layer a compound containing an aromatic ring or furan ring containing a carboxyl group or nitro group either alone or in combination with a dicarboxylic acid anhydride as disclosed in JP-B-42-6878 and JP-B-45-3073. However, the thus improved photosensitive materials are still insufficient with regard to electrostatic characteristics, particularly in light decay characteristics. The insufficient sensitivity of these photosensitive materials has been compensated by incorporating a large quantity of a sensitizing dye into the photoconductive layer. However, photosensitive materials containing a large quantity of a sensitizing dye suffer considerable deterioration of whiteness, which means reduced quality as a recording medium, sometimes causing deterioration of dark decay characteristics, resulting in a failure to obtain a satisfactory reproduced image.

On the other hand, JP-A-60-10254 (the term "JP-A" as used herein means an "unexamined published Japanese patent application") suggests to control an average molecular weight of a resin to be used as a binder of the photoconductive layer. According to this suggestion, a combined use of an acrylic resin having an acid value of from 4 to 50 whose average molecular weight is distributed within two ranges, i.e. a range of from $1\times10^3$ to $1\times10^4$ and a range of from $1\times10^4$ and $2\times10^5$, would improve electrostatic characteristics, particularly reproducibility as a PPC photoreceptor on repeated use, moisture resistance and the like.

In the field of lithographic printing plate precursors, extensive studies have been conducted to provide binder resins for a photoconductive layer having electrostatic characteristics compatible with printing characteristics. Examples of binder resins so far reported to be effective for oil-desensitization of a photoconductive layer include a resin having a molecular weight of from $1.8\times10^4$ to $10\times10^4$ and a glass transition point of from 10° C. to 80° C. obtained by copolymerizing a (meth)acrylate monomer and a copolymerizable monomer in the presence of fumaric acid in combination with a copolymer of a (meth)acrylate monomer and a copolymerizable monomer other than fumaric acid as disclosed in JP-B-50-31011; a terpolymer containing a (meth)acrylic ester unit having a substituent having a carboxyl group at least 7 atoms distant from the ester linkage as disclosed in JP-A-53-54027; a tetra- or pentapolymer containing an acrylic acid unit and a hydroxyethyl (meth)acrylate unit as disclosed in JP-A-54-20735 and JP-A-57-202544; a terpolymer containing a (meth)acrylic ester unit having an alkyl group having from 6 to 12 carbon atoms as a substituent and a vinyl monomer containing a carboxyl group as disclosed in JP-A-58-68046; and the like.

Nevertheless, none of these resins proposed has been proved satisfactory for practical use in charging properties, dark charge retention, photosensitivity, and surface smoothness of a photoconductive layer.

The binder resins proposed for use in electrophotographic lithographic printing plate precursors were also proved by actual evaluations to give rise to problems relating to electrostatic characteristics and background staining of prints.

SUMMARY OF THE INVENTION

One object of this invention is to provide an electrophotographic photoreceptor having improved electrostatic characteristics, particularly dark charge retention and photosensitivity, and improved image reproducibility.

Another object of this invention is to provide an electrophotographic photoreceptor which can form a clear reproduced image of high quality irrespective of a variation of environmental conditions at the time of reproduction of an image, such as a change to a low-temperature and low-humidity condition or to a high-temperature and high-humidity condition.

A further object of this invention is to provide a CPC electrophotographic photoreceptor having excellent electrostatic characteristics and small dependence on the environment.

A still further object of this invention is to provide an electrophotographic lithographic printing plate precursor which provides a lithographic printing plate causing no background stains.

It has now been found that the above objects of this invention can be accomplished by an electrophotographic photoreceptor comprising a support having provided thereon at least one photoconductive layer containing at least an inorganic photoconductive substance and a binder resin, wherein said binder resin comprises at least one copolymer resin comprising a monofunctional macromonomer (M) and a monomer (A), said monofunctional macromonomer (M) having a weight average molecular weight of not more than $2\times10^4$ and containing at least one polymerization component represented by formula (II-a) or (II-b):

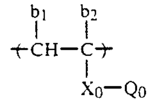

(II-a)

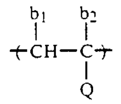

(II-b)

wherein $X_0$ represents —COO—, —OCO—, —$CH_2$OCO—, —$CH_2$COO—, —O—, —$SO_2$—, —CO—,

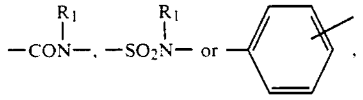

wherein $R_1$ represents a hydrogen atom or a hydrocarbon group; $Q_0$ represents an aliphatic group having from 1 to 18 carbon atoms or an aromatic group having from 6 to 12 carbon atoms, said carbon numbers not inclusive of substituents; $b_1$ and $b_2$, which may be the same or different, each represents a hydrogen atom, a halogen atom, a cyano group, a hydrocarbon group, —COO—Z or —COO—Z bonded via a hydrocarbon group, wherein Z represents a hydrogen atom or a substituted or unsubstituted hydrocarbon group; and Q represents —CN, —$CONH_2$ or

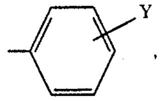

wherein Y represents a hydrogen atom, a halogen atom, an alkoxyl group or —COOZ′, wherein Z′ represents an alkyl group, an aralkyl group or an aryl group, with a polymerizable double bond-containing group represented by formula (I) being bonded to only one of the terminals of the main chain of said macromonomer:

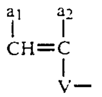

(I)

wherein V has the same meaning as $X_0$; and $a_1$ and $a_2$, which may be the same or different, each has the same meaning as $b_1$ and $b_2$, said monomer (A) being represented by formula (III)

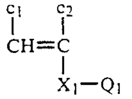

(III)

wherein $X_1$ has the same meaning as $X_0$; $Q_1$ has the same meaning as $Q_0$; and $c_1$ and $c_2$, which may be the same or different, has the same meaning as $b_1$ and $b_2$, and at least one polar group selected from —$PO_3H_2$, —$SO_3H$, —COOH, —OH, —SH, and

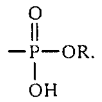

wherein R represents a hydrocarbon group, being bonded to only one of terminals of the main chain of said copolymer.

DETAILED DESCRIPTION OF THE INVENTION

The binder resin which can be used in the present invention comprises a graft copolymer containing at least the monofunctional macromonomer (M) and the monomer (A) represented by formula (III), with a specific polar group being bonded to only one of the terminals of the copolymer main chain.

The monofunctional monomer (M) is a polymer having a weight average molecular weight of not more than $2\times10^4$ which comprises at least one polymerization component represented by formula (II-a) or (II-b), with a polymerizable double bond-containing group represented by formula (I) being bonded to only one of the terminals of the main chain thereof.

In formulae (I), (IIa), and (IIb), the hydrocarbon groups as represented by $a_1$, $a_2$, V, $b_1$, $b_2$, $X_0$, $Q_0$, and Q, which contain the respectively recited number of carbon atoms when unsubstituted, may have a substituent.

In formula (I), V represents —COO—, —OCO—, —$CH_2$OCO—, —$CH_2$COO—, —O—, —$SO_2$—, —CO—,

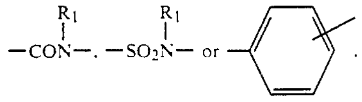

wherein $R_1$ represents a hydrogen atom or a hydrocarbon group. Preferred hydrocarbon groups as $R_1$ include a substituted or unsubstituted alkyl group having from 1 to 18 carbon atoms (e.g., methyl, ethyl, propyl, butyl, heptyl, hexyl, octyl, decyl, dodecyl, hexadecyl, octadecyl, 2-chloroethyl, 2-bromoethyl, 2-cyanoethyl, 2-methoxycarbonylethyl, 2-methoxyethyl, and 3-bromopropyl), a substituted or unsubstituted alkenyl group having from 4 to 18 carbon atoms (e.g., 2-methyl-1-propenyl, 2-butenyl, 2-pentenyl, 3-methyl-2-pentenyl, 1-pentenyl, 1-hexenyl, 2-hexenyl, and 4-methyl-2-hexenyl), a substituted or unsubstituted aralkyl group having from 7 to 12 carbon atoms (e.g., benzyl, phenethyl, 3-phenylpropyl, naphthylmethyl, 2-naphthylethyl, chlorobenzyl, bromobenzyl, methylbenzyl, ethylbenzyl, methoxybenzyl, dimethylbenzyl, and dimethoxybenzyl), a substituted or unsubstituted alicyclic group having from 5 to 8 carbon atoms (e.g., cyclohexyl, 2-cyclohexylethyl, and 2-cyclopentylethyl), and a substituted or unsubstituted aromatic group having from 6 to 12 carbon atoms (e.g., phenyl, naphthyl, tolyl, xylyl, propylphenyl, butylphenyl, octylphenyl, dodecylphenyl, methoxyphenyl, ethoxyphenyl, butoxyphenyl, decyloxyphenyl, chlorophenyl, dichlorophenyl, bromophenyl, cyanophenyl, acetylphenyl, methoxycarbonylphenyl, ethoxycarbonylphenyl, butoxycarbonylphenyl, acetamidophenyl, propionamidophenyl, and dodecyloylamidophenyl).

When V represents

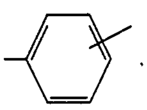, the benzene ring may have a substitutent, such as a halogen atom (e.g., chlorine and bromine), an alkyl 9group (e.g., methyl, ethyl, propyl, butyl, chloromethyl, and methoxymethyl), and an alkoxyl group (e.g., methoxy, ethoxy, propoxy, and butoxy).

$a_1$ and $a_2$, which may be the same or different, each preferably represents a hydrogen atom, a halogen atom (e.g., chlorine and fluorine), a cyano group, an alkyl group having from 1 to 4 carbon atoms (e.g., methyl, ethyl, propyl and butyl), or —COO—Z or —COO—Z bonded via a hydrocarbon group wherein Z represents a hydrogen atom or an alkyl, alkenyl, aralkyl, alicyclic or aryl group having up to 18 carbon atoms, each of which may be substituted. More specifically, the examples of the hydrocarbon groups as enumerated for $R_1$ are applicable to Z. The hydrocarbon group via which —COO—Z is bonded includes a methylene group, an ethylene group, and a propylene group.

More preferably, in formula (I), V represents —COO—, —OCO—, —$CH_2$OCO—, —$CH_2$COO—, —O—, —CONH—, —$SO_2$HN— or

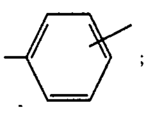;

and $a_1$ and $a_2$, which may be the same or different, each represents a hydrogen atom, a methyl group, —COOZ, or —$CH_2$COOZ, wherein Z represents a hydrogen atom or an alkyl group having from 1 to 6 carbon atoms (e.g., methyl, ethyl, propyl, butyl, and hexyl). Most preferably, either one of $a_1$ and $a_2$ represents a hydrogen atom.

Specific examples of the polymerizable double bond-containing group represented by formula (I) are

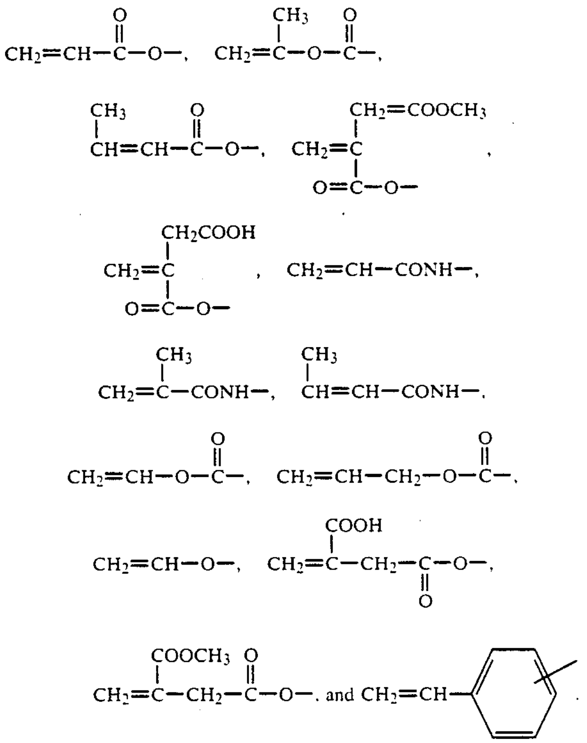

If formulae (IIa) and (IIb), $X_0$ has the same meaning as V in formula (I); $b_1$ and $b_2$, which may be the same or different, each has the same meaning as $a_2$ and $a_2$ in formula (I); and $Q_0$ represents an aliphatic group having from 1 to 18 carbon atoms or an aromatic group having from 6 to 12 carbon atoms. Examples of the aliphatic group for $Q_0$ include a substituted or unsubstituted alkyl group having from 1 to 18 carbon atoms (e.g., methyl, ethyl, propyl, butyl, heptyl, hexyl, octyl, decyl, dodecyl, tridecyl, hexadecyl, octadecyl, 2-chloroethyl, 2-bromoethyl, 2-hydroxyethyl, 2-methoxyethyl, 2-ethoxyethyl, 2-cyanoethyl, 3-chloropropyl, 2-(trimethoxysilyl)ethyl, 2-terrahydrofuryl, 2-thienylethyl, 2-N,N-dimethylaminoethyl, 2-N,N-diethylaminoethyl), a cycloalkyl group having from 5 to 8 carbon atoms (e.g., cyloheptyl, cyclohexyl, and cyclooctyl), and a substituted for unsubstituted aralkyl group having from 7 to 12 carbon atoms (e.g., benzyl, phenethyl, 3-phenylpropyl, naphthylmethyl, 2-naphthylethyl, chlorobenzyl, bromobenzyl, diclorobenzyl, methylbenzyl, chloromethylbenzyl, dimethylbenzyl, trimethylbenzyl, and methoxybenzyl). Examples of the aromatic group for $Q_0$ include a substituted or unsubstituted aryl group having from 6 to 12 carbon atoms non-inclusive of substituents (e.g., phenyl, tolyl, xylyl, chlorophenyl, bromophenyl, dichlorophenyl, chloromethylphenyl, methoxyphenyl, methoxycarbonylphenyl, naphthyl, and chloronaphthyl).

In formula (IIa), $X_0$ preferably represents —COO—, —OCO—, —$CH_2$COO—, —$CH_2$OCO—, —O—, —CO—, —CONH—, —$SO_2$NH—, or

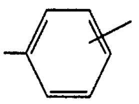.

Preferred examples of $b_1$ and $b_2$ are the same as those described as preferred examples of $a_1$ and $a_2$.

In formula (IIb), Q represents —CN, —$CONH_2$, or

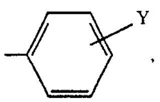

wherein Y represents a hydrogen atom, a halogen atom (e.g., chlorine and bromine), an alkoxyl group (e.g., methoxy, ethoxy, propoxy, and butoxy), or —COOZ', wherein Z' preferably represents an alkyl group having from 1 to 8 carbon atoms, an aralkyl group having from 7 to 12 carbon atoms, or an aryl group.

The macromonomer (M) may contain two or more polymerization components represented by formulae (IIa) and/or (IIb). In cases where $X_0$ in formula (II—a) is —COO—, it is preferable that the proportion of such a polymerization component of (II-a) be at least 30% by weight based on the total polymerization component in the macromonomer (M).

In addition to the polymerization components of formulae (II-a) and/or (II-b), the macromonomer (M) may further contain other repeating units derived from copolymerizable monomers in an amount of 0 to 50 wt % and preferably 0 to 30 wt % based on the copolymer. Such monomers include acrylonitrile, methacrylonitrile, acrylamides, methacrylamides, styrene and its derivatives (e.g., vinyltoluene, chlorostyrene, dichlorostyrene, bromostyrene, hydroxymethylstyrene, and N,N-dimethylaminomethylstyrene), and heterocyclic vinyl compounds (e.g., vinylpyridine, vinylimidazole, vinylpyrrolidone, vinylthiophene, vinylpyrazole, vinyldioxane, and vinyloxazine).

As illustrated above, the macromonomer (M) to be used in the present invention has a chemical structure in which a polymerizable double bond-containing group represented by formula (I) is bonded to one of the terminals of a polymer main chain comprising the repeating unit of formula (II-a) and/or the repeating unit of formula (II-b) either directly or via an arbitrary linking group.

The linking mode which connects the component of formula (I) and the component of (II-a) or (II-b) includes a carbon-carbon bond (either single bond or double bond), a carbon-hetero atom bond (the hetero atom includes an oxygen atom, a sulfur atom, a nitrogen atom, and a silicon atom), a hetero atom-hetero atom bond, and an arbitrary combination thereof.

Preferred of the above-described macromonomers (M) are those represented by formula (IVa) or (IVb):

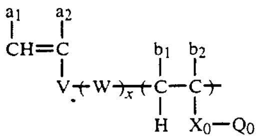

(IVa)

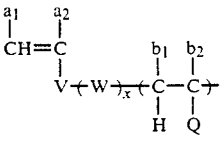

(IVb)

wherein $a_1$,$a_2$, $b_1$, $b_2$, $X_0$, $Q_0$, Q, and V are as defined above; and x represents 0 or 1.

The linking group as represented by W includes a

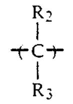

[wherein $R_2$ and $R_3$ each represents a hydrogen atom, a halogen atom (e.g., fluorine, chlorine, and bromine), a cyano group, a hydroxyl group or an alkyl group (e.g., methyl, ethyl, and propyl)],

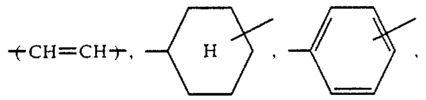

—O—, —S—,

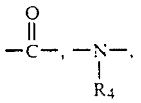

—COO—, —$SO_2$,

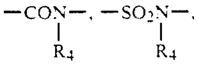

—NHCOO—,
—NHCONH—,

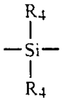

[wherein $R_4$ represents a hydrogen atom, a hydrocarbon group similar to those recited for $Q_0$, etc.], and an arbitrary combination thereof.

If the weight average molecular weight of the macromonomer (M) exceeds $2\times10^4$, copolymerizability with the monomer (A) decreases. If it is too small, the effect of improving electrophotographic characteristics becomes small so that it is preferably at least $1\times10^3$.

The macromonomer (M) of the present invention can be prepared according to known processes, such as an ion polymerization process in which a reagent of various kinds is reacted on the terminal of a living polymer obtained by anion polymerization or cation polymerization to form a macromer; a radical polymerization process in which a reagent of various kinds is reacted on a reactive group-terminated oligomer obtained by radical polymerization in the presence of a polymerization initiator and/or a chain transfer agent containing a reactive group, e.g., carboxyl, hydroxyl, and amino groups, to form a macromer; and a polyaddition or polycondensation process in which a polymerizable double bond-containing group is introduced into an oligomer obtained by polyaddition or polycondensation in the same manner as in the radical polymerization process.

More specifically, reference can be made to processes in P. Dreyfuss & R. P. Quirk, *Encycl. Polym. Sci. Enq.*, Vol 7, p. 551 (1987), P. F. Rempp, E. Franta, Adu., *Polym. Sci.*, Vol. 58, p. 1 (1984), V. Percec, *Appl. Polym. Sci.*, Vol. 285, p. 95 (1984), R. Asami and M. Takari, *Makvamol, Chem. Suppl.*, Vol. 12, p. 163 (1985), R. Rempp, et al., *Makvamol. Chem. Suppl.*, Vol. 8, p 3

(1984), Yusuke Kawakami, *Kaqaku Koqyo,* Vol. 38, p. 56 (1987), Yuya Yamashita, *Kobunshi,* Vol 31, p. 988 (1982), Shiro Kobayashi, *Kobunshi,* Vol. 30, p. 652 (1981), Toshinobu Higashimura, *Nihon Secchaku Kyokaishi,* Vol 18, p. 536 (1982), Koichi Ito, *Kobunshi Kako,* Vol. 35, p. 262 (1986), and Shiro Toki and Takashi Tsuda *Kono Zairyo,* Vol. 1987, No. 10, p. 5., and literatures cited therein.

Specific examples of the macromonomer (m) are shown below for illustrative purposes only but not for limitation.

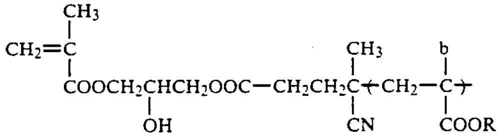

(1)

b: H, $CH_3$ or $-CH_2COOCH_3$

R: $-C_nH_{2n+1}$ (n = integer of 1 to 18), $-CH_2C_6H_5$, $-C_6H_5$, 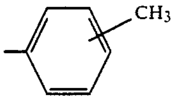

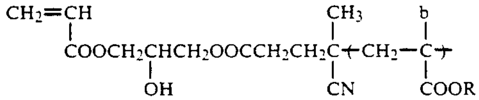

(2)

b: H, $CH_3$ or $-CH_2COOCH_3$

R: $-C_nH_{2n+1}$ (n = integer of 1 to 18), $-CH_2C_6H_5$, $-C_6H_5$, 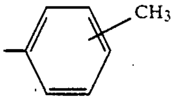

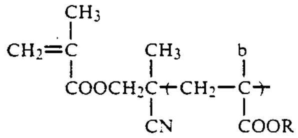

(3)

b: H, $CH_3$

R: $-C_nH_{2n-1}$ (n = integer of 1 to 18), $-(CH_2)_mC_6H_5$ (m = integer of 1 to 3),

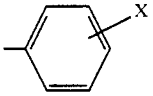 (X: $CH_3$, Cl, Br, $OCH_3$)

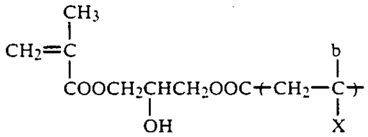

(4)

b: H, $CH_3$, X: $-COOCH_3$, $-C_6H_5$, $-CN$

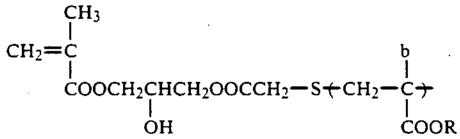

(5)

b: H, or $CH_3$

R: $-C_nH_{2n+1}$ (n = integer of 1 to 18), $-CH_2C_6H_5$, $-C_6H_5$, 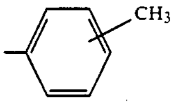

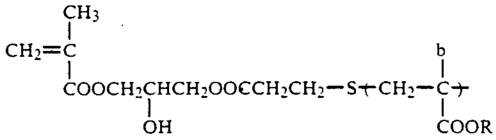

(6)

b: H, $CH_3$ or $-CH_2COOCH_3$

R: $-C_nH_{2n-1}$ (n = integer of 1 to 18),

-continued $-CH_2C_6H_5$, $-C_6H_5$, 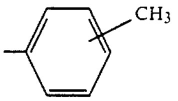

(7)

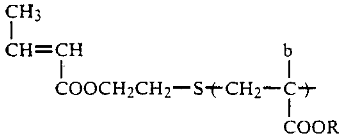

(8)

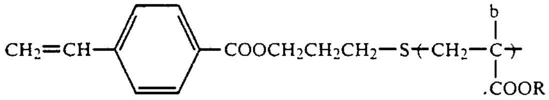

b: H, $CH_3$
R: $-C_nH_{2n+1}$ (n = integer 1 to 18),
$-CH_2C_6H_5$, $-C_6H_5$, 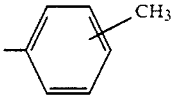

(9)

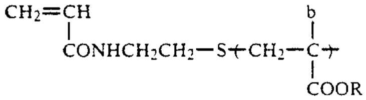

b: H, $CH_3$
R: $-C_nH_{2n+1}$ (n = integer of 1 to 18),
$-CH_2C_6H_5$, $-C_6H_5$ (10)

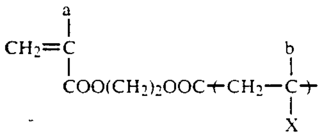

a: H, $CH_3$, b: H, $CH_3$
X: $-OC_nH_{2n-1}$ (n = integer of 1 to 18),
$-OCOC_mH_{2m+1}$ (m = integer of 1 to 18),
$-COOCH_3$, $-C_6H_5$, $-CN$ (11)

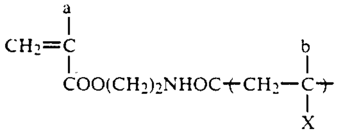

a. H, $CH_3$, b: H, $CH_3$

X: $-COOCH_3$, $-C_6H_5$, 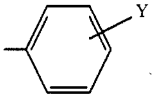

(Y: $-CH_3$, $-Cl$, $-Br$), $-CN$ (12)

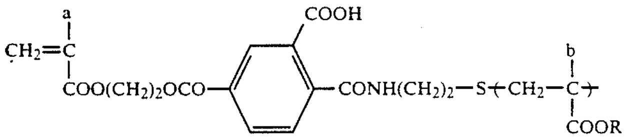

a: H, $CH_3$, b: H, $CH_3$
R: $-C_nH_{2n+1}$ (n = integer of 1 to 18),
$-CH_2C_6H_5$, $-C_6H_5$ (13)

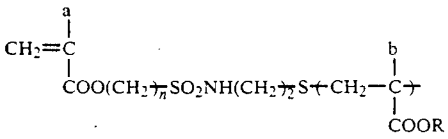

a: H, $CH_3$, b: H, $CH_3$ n = integer of 2 to 4),
R: $-C_nH_{2n+1}$ (n = integer of 1 to 18),
$-CH_2C_6H_5$, $-C_6H_5$ -continued (14)

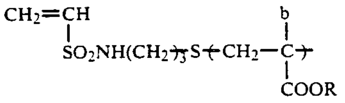

b: H, $CH_3$
R: $-C_nH_{2n+1}$ (n = integer of 1 to 18), $-CH_2C_6H_5$, $-C_6H_5$ (15)

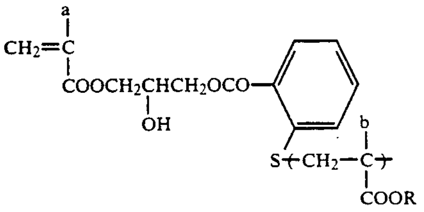

a: H, $CH_3$, b: H, $CH_3$
R: $-C_nH_{2n+1}$ (n = integer of 1 to 18), $-CH_2C_6H_5$, $-C_6H_5$ (16)

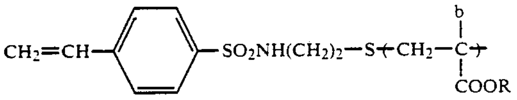

b: H, $CH_3$
R: $-C_nH_{2n+1}$ (n = integer of 1 to 18), $-CH_2C_6H_5$, $-C_6H_5$ (17)

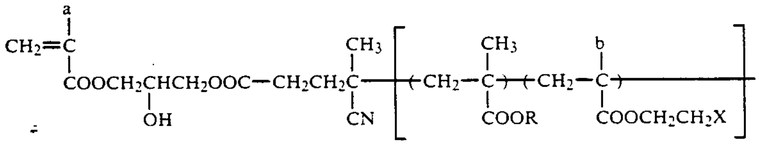

a: H, $CH_3$, b: H, $CH_3$
R: $-C_nH_{2n+1}$ (n = integer of 1 to 18), $-CH_2C_6H_5$, $-C_6H_5$
X: —Cl, —Br, —F, —OH, —CN (18)

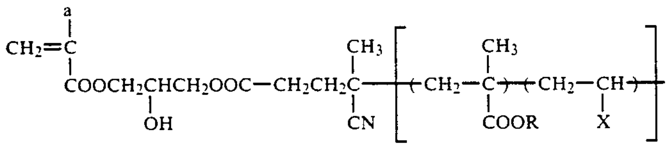

a: H, $CH_3$,
X: $-OCOC_nH_{2n+1}$ (n = integer of 1 to 18), —CN, $-CONH_2$, $-C_6H_5$
R: $-C_nH_{2n+1}$ (n = integer of 1 to18), $-CH_2C_6H_5$ (19)

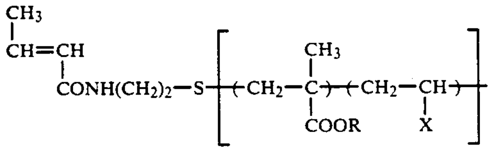

X: —CH, $-CONH_2$, $-C_6H_5$
R: $-C_nH_{2n+1}$ (n = integer 1 to 18), $-CH_2C_6H_5$,

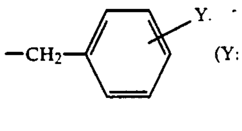
(Y: Cl, Br, $CH_3$, $-OCH_3$)

(20)

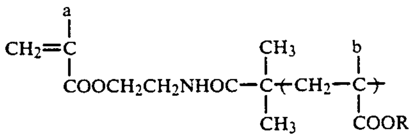

a: H, $CH_3$, b: H, $CH_3$, $-CH_2COOCH_3$
R: $-C_nH_{2n+1}$ (n = integer of 1 to 18), $-CH_2C_6H_5$ -continued (21)

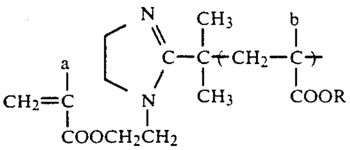

a: H, $CH_3$, b: H, $CH_3$, $-CH_2COOCH_3$
R: $-C_nH_{2n+1}$ (n = integer of 1 to 18), $-CH_2C_6H_5$ (22)

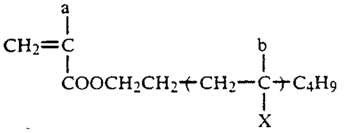

a: H, $CH_3$, b: H, $CH_3$,
X: $-COOCH_3$, $-C_6H_5$

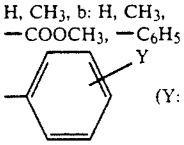

(Y: Cl, Br, $CH_3$, $-OCH_3$)

(23)

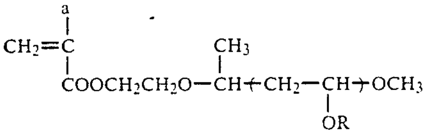

a: H, $CH_3$
R: $-C_nH_{2n+1}$ (n = integer of 1 to 18)

(24)

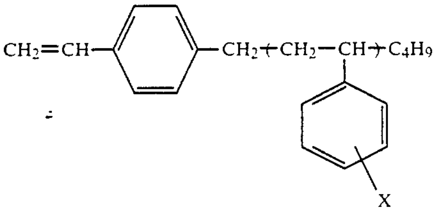

X: H, $CH_3$, Cl, Br, $OCH_3$, $-COOCH_3$

The monomer (A) which is copolymerized with the macromonomer (M) is represented by formula (III), wherein $c_1$ and $c_1$, which may be the same or different, each has the same meaning as $a_1$ and $a_2$ in formula (I); $X_1$ has the same meaning as $X_0$ in formula (IIa); and $Q_1$ has the same meaning as $Q_0$ in formula (IIa).

In the binder resin according to the present invention, the weight ratio of the copolymerization component corresponding to the macromonomer (M) to the copolymerization component corresponding to the monomer of formula (III) is preferably 1:99 to 90:10, more preferably 5:95 to 60:40.

It is preferable that the copolymer resin does not contain a copolymerization component containing a polar group selected from $—PO_3H_2$, $—SO_3H$, —COOH, —OH, —SH, and $—PO_3RH$ (wherein R is as defined above) in the main chain thereof.

In the binder resin of the present invention, at least one polar group selected from $—PO_3H_2$, $—SO_3H$, —COOH, —OH, —SH, and $—PO_3RH$ (wherein R is as defined above) is bonded to only one of the terminals of the copolymer main chain. The polar group is bonded to the terminal either directly or via an arbitrary linking group.

The linking group for connecting the polar group to the terminal of the copolymer main chain includes a carbon-carbon bond (either single bond or double bond), a carbon-hetero atom bond (the hereto atom includes an oxygen atom, a sulfur atom, a nitrogen atom, and a silicon atom), a hereto atom-hetero atom bond, and an arbitrary combination thereof. Examples of the linking group includes

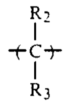

[wherein $R_2$ and $R_3$ each represents a hydrogen atom, a halogen atom (e.g., fluorine, chlorine, and bromine), a cyano group, a hydroxyl group or an alkyl group (e.g., methyl, ethyl, and propyl)], $-(CH=CH)-$, 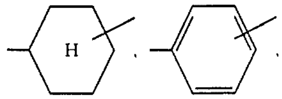

—O—, —S—,

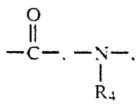

—COO—, —$SO_2$—,

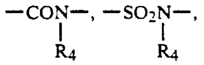

—NHCOO—, —NHCONH—,

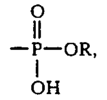

[wherein $R_4$ represents a hydrogen atom, a hydrocarbon group similar to those recited for $Q_0$, etc.], and an arbitrary combination thereof.

In the polar group

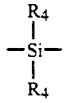

the hydrocarbon group as represented by R preferably a substituted or unsubstituted aliphatic group having from 1 to 22 carbon atoms (e.g., methyl, ethyl, propyl, butyl, hexl, octyl, decyl, dodecyl, octadecyl, 2-chloroethyl, 2-methoxyethyl, 2-ethoxypropyl, allyl, crotonyl, butenyl, cyclohexyl, benzyl, phenethyl, 3-phenylpropyl, methylbenzyl, chlorobenzyl, fluorobenzyl, and methoxybenzyl) and a substituted or unsubstituted aryl group (e.g., phenyl, tolyl, ethylphenyl, propylphenyl, chlorophenyl, fluorophenyl, bromophenyl, chloromethylphenyl, dichlorophenyl, methoxyphenyl, cyanophenyl, acetamidophenyl, acetylphenyl, and butoxyphenyl).

The binder resin in which the specific polar group is bonded to only one terminal of the polymer main chain can be prepared easily by various process, such as a process in which a reagent of various kinds is reacted on a terminal of a living polymer obtained by known anion or cation polymerization techniques (ion polymerization process); a process utilizing radical polymerization using a polymerization initiator and/or a chain transfer agent containing the specific polar group in the molecule thereof (radical polymerization process); and a process in which a terminal of a reactive group-terminated polymer obtained by the above-described ion polymerization or radical polymerization is converted to the specific polar group by a high polymer reaction.

More specifically, reference can be made to processes in P. Dreyfuss and R. P. Quirk, *Encycl. Polym. Sci. Eng.*, Vol. 7, p. 551 (1987), Yoshiki Nakajo and Yuya Yamashita, *Senryo to Yakuhin*, Vol. 30, p. 232 (1985), and Akira Ueda and Susumu Nagai, *Kaqaku to Koqyo*, Vol. 60, p. 57 (1986), and literatures cited therein.

The binder resin according to the present invention has a weight average molecular weight of from $1\times10^3$ to $5\times10^5$, preferably from $5\times10^3$ to $2\times10^5$. The resin preferably has a glass transition point ranging from $-20°$ C. to 120° C., more preferably from 0° to 90° C.

The content of the specific polar group in the resin ranges form 0.1 to 10 parts by weight per 100 parts by weight of the resin. When the resin has a relatively low molecular weight of from $1\times10^3$ to $1\times10^4$, the content of the polar group is preferably relatively high, ranging from 3 to 10 parts by weight per 100 parts by weight of the resin. On the other hand, when the resin has a relatively high molecular weight of from $7\times10^4$ to $5\times10^5$, the content of the polar group is preferably relatively low, ranging from 0.2 to 2 parts by weight per 100 parts by weight of the resin.

The above-stated known binder resins containing an acidic group have been proposed chiefly for use in an offset master plate and, hence, have a large molecular weight (e.g., $5\times10^4$ to $1\times10^5$) in order to assure film strength to thereby improve printing durability (or press life). In addition, these conventional resins are random copolymers wherein an acidic group-containing copolymerization component is present in the polymer main chain at random.

To the contrary, the binder resin according to the present invention is a graft copolymer wherein a polar group (acidic group) is bonded to only one of the terminals of the polymer main chain.

In the resin of the present invention, the polar group bonded to a specific position thereof is absorbed onto stoichiometrical defects of an inorganic photoconductive substance and, in addition, the resin being a graft copolymer, exhibits improved covering power over the surface of the photoconductive substance, whereby electron traps of the photoconductive substance can be compensated for and humidity resistance can be improved, while assisting the photoconductive particles to be sufficiently dispersed without causing agglomeration. It is believed that improvements on electrophotographic characteristics, particularly charging properties, dark charge retention, and photosensitivity can be brought about as a result.

In the case where the resin of the present invention having a weight average molecular weight of $1.5\times10^4$ or less is used as a binder, there was a fear of making the film brittle. Such a fear has turned out to be unnecessary because the binder resin is sufficiently adsorbed onto the photoconductive particles to cover the surface thereof as stated above to provide an electrophotographic photoreceptor which exhibits satisfactory surface smoothness and electrostatic characteristics and forms a reproduced image free from background fog. The resulting photoreceptor has sufficient film strength for use as a CPC photoreceptor or a lithographic printing plate precursor which provides a small-scale printing offset master plate for obtaining up to several thousands of prints.

If the weight average molecular weight of the resin is $1\times10^3$ or less, the ability to disperse the photoconductive particles is insufficient, failing to form a homogenerous photoconductive layer. On the other hand, if the weight average molecular weight exceeds $5\times10^5$, the interaction between the polar group of the resin and the inorganic photoconductive substance is weakened, and also the photoconductive substance cannot be sufficiently dispersed, which results in the failure of film formation or results in formation of a film having considerably rough surface and thus deteriorated strength against mechanical abrasion.

In general, if a photoreceptor to be used as lithographic printing plate precursor is prepared from a non-uniform dispersion of photoconductive particles in a binder resin with agglomerates being present, the photoconductive layer would have a rough surface. As a result, non-image areas cannot be rendered uniformly hydrophilic by oil-desensitization treatment with an oil-desensitizing solution. Such being the case, the resulting printing plate induces adhesion of a printing ink to the non-image areas on printing, which phenomenon leads to background stains of the non-image areas of prints.

In a preferred embodiment of the present invention, excellent electrophotographic characteristics and improved printing durability can be obtained by using a combination of a relatively low-molecular weight resin (e.g., $Mw=1\times10^3$ to $1\times10^4$) and a relatively high-molecular weight resin (e.g., MW $5\times10^4$ or more), both being implicit in the resin according to the present invention.

In another preferred embodiment of the present invention, the resin containing the macromonomer (M) and the monomer (A) can further contain a monomer (B) having at least one heat-curable functional group as a third copolymerization component. The monomer (B) may be contained preferably in an amount of from 0.5 to 30 wt %, more preferably from, 1 to 20 wt % based on the resin. In this embodiment, the heat-curable functional group appropriately forms a crosslinked structure among polymers to thereby ensure the interaction among polymers and to improve film strength Accordingly, such a resin has a heightened interaction among binder resin polymers without impairing the adsorption and covering effects between the inorganic photoconductive particles and binder resin polymers, to thereby bring about further improvement of film strength.

The term "heat-curable functional group" means a functional group inducing heat-curing reaction, including functional groups other than the above-described polar groups (i.e., $PO_3H_2$, $SO_3H$, COOH, etc.). Examples of usable heat-curable functional groups are described in, e.g., Tsuyoshi Endo, *Netsukokasei Kobunshi no Seimitsuka,* C.M.C. K.K. (1986), Yuji Harasaki, *Saishin Binder Gijutsu Binran,* Ch. II-I, Sogo Gijutsu Center (1985), Takayuki Ohtsu, *Acryl Jushi no Gosei Sekkei to Shnyoto Kaihatsu,* Chubu Kei-ei Kaihatsu Center Shuppanbu (1985), and Eizo Ohmori, *Kinosei Acryl-kei Jushi,* Techno System (1985).

Specific examples of the heat-curable functional group includes —OH, —SH, —$NH^2$, —$NHR_5$ (wherein $R_5$ represents a hydrocarbon groups, specifically including those enumerated as to $R_1$),

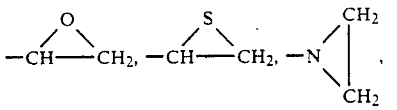

—$CONHCH_2OR_6$ [$R_6$ represents a hydrogen atom or an alkyl group having from 1 to 8 carbon atoms (e.g., methyl, ethyl, propyl, butyl, hexyl, and octyl)], —N=C=O, and

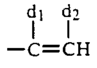

[wherein $d_1$ and $d_2$ each represents a hydrogen, a halogen atom (e.g., Cl and Br), or an alkyl group having from 1 to 4 carbon atoms (e.g., methyl and ethyl)].

The polymerizable double bond-containing group includes $CH_2$=CH—, $CH_2$=CH—$CH_2$—,

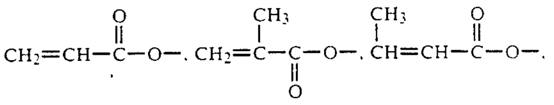

$CH_2$=CH—CONH—,

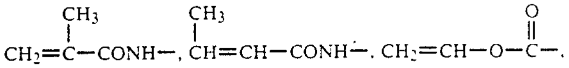

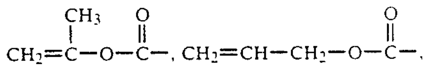

$CH_2$=CH—NHCO—, $CH_2$=CH—$CH_2$—NHCO—, $CH_2$=CH—$SO_2$—, $CH_2$=CH—CO—, $CH_2$=CH—O—, and $CH_2$=CH—S—.

The resin binder of the present invention may further comprise other copolymerization components in addition to the macromonomer (M), the monomer (A) and, if desired, the heat-curable functional group-containing monomer (B). Examples of monomers corresponding to such copolymerization components include α-olefins, acrylonitrile, methacrylonitrile, acrylamides, methacrylamides, styrenes, vinyl-containing naphthalene compounds (e.g., vinylnaphthalene and 1-isopropenylnaphthalene), and heterocyclic vinyl compounds (e.g., vinylpyrrolidone, vinylpyridine, vinylimidazole, vinylthiophene, vinyltetrahydrofuran, vinyl-1,3-dioxoran, vinylthiazole, and vinyloxazoline).

The above-described resin containing the heat-curable functional group can be obtained by using a monomer containing the heat-curable functional group as a heat-curable functional group-containing copolymerization component.

Since mere use of a monomer containing the polar group does not always result in production of a polymer in which such a polar group-containing monomer is bonded to the terminal, a general polymerization technique cannot be applied to the preparation of the resin of the present invention. Accordingly, the resin of the present invention can be synthesized in such a manner that the polar group may be bonded to the terminal of the main chain of the copolymer comprising the above-described copolymerization components. In some detail, such can be achieved by a process of using a polymerization initiator containing the polar group or a functional group capable of being converted to the polar group afterwards, a process of using a chain transfer agent containing the polar group or a functional group capable of being converted to the polar group afterwards, a process of using both of the above-described polymerization initiator and chain transfer agent, or a process in which the functional group is introduced into a polymer utilizing reaction cease in anion polymerization.

For the details, reference can be made to it in P. Dreyfuss and R.P. Quirk, *Encycl. Polym. Sci. Eng.,* Vol. 7, p. 551 (1987), V. Percec, *Appl. Polym. Sci.,* Vol. 285, p. 95 (1985), P.F. Rempp and E. Franta, *Adv. Polym. Sci.,* Vol. 58, p. 1 (1984), Y. Yamashita, *J. Appl. Polym. Sci. Appl. Polym. Symp.,* Vol. 36, p 193 (1981), and R. Asami and M. Takaki, *Macromol, Chem. Suppl.,* Vol. 12, p.1763 (1985).

In the present invention, when the binder resin contains a heat-curable functional group, it is preferable to use a reaction accelerator for accelerating the crosslinking reaction in the photoconductive layer, if desired.

In the case where the crosslinking reaction is effected through formation of a chemical bond between functional groups, the reaction accelerator to be used includes organic acid types crosslinking agents (e.g., acetic acid, propionic acid, butyric acid, benzenesulfonic acid, and p-toluenesulfonic acid). Compounds described in Shinzo Yamashita and Tosuke Kaneko (ed.) *Kakyozai Handbook,* Taiseisha (1981) can also be used as a crosslinking agent. For example, generally employed crosslinking agents such as organosilanes, polyurethanes, and polyisocyanates, and curing agents employed for epoxy resins and melamine resins can be used.

In the case where the crosslinking reaction is effected through the polymerization reaction, reaction accelerators to be used include polymerization initiators (such as peroxides and azobis compounds, preferably azobis type polymerization initiators) and polyfunctional polymerizable group-containing monomers (e.g., vinyl methacrylate, allyl methacrylate, ethylene glycol diacrylate, polyethylene glycol diacrylate, divinylsuccinic esters, divinyladipic esters, diallylsuccinic esters, 2-methylvinyl methacrylate, and divinylbenzene).

In the case where the binder resin contains a heat-curable functional group, the photoconductive substance-binder resin dispersed system is subjected to heat-curing treatment. The heat-curing treatment can be carried out by drying the photoconductive coating under conditions more severe than those generally employed for the preparation of conventional photoreceptors. For example, the heat-curing can be achieved by drying the coating at a temperature of from 60° to 120° C. for 5 to 120 minutes. In this case, a combined use with the abovedescribed reaction accelerator makes it possible to make the heat curing treatment conditions milder.

The inorganic photoconductive substance which can be used in the present invention includes zinc oxide, titanium oxide, zinc sulfide, cadmium sulfide, cadmium carbonate, zinc selenide, cadmium selenide, tellurium selenide, and lead sulfide.

The binder resin is used in an amount of from 10 to 100 parts by weight, preferably from 15 to 50 parts by weight, per 100 parts by weight of the inorganic photoconductive substance.

If desired, the photoconductive layer according to the present invention may contain various spectral sensitizers. Examples of the spectral sensitizers are carbonium dyes, diphenylmethane dyes, triphenylmethane dyes, xanthene dyes, phthalein dyes, polymethine dyes (e. g., oxonol dyes, merocyanine dyes, cyanine dyes, rhodacyanine dyes, and styryl dyes), phthalocyanine dyes (inclusive of metallized dyes), and the like, described in Harushi Miyamoto and Hidehiko Tabei, *Imaqinq,* Vol. 1973, No. 8, P. 12, C. J. Young, et al., *RCA Review* Vol. 15, No.469, (19-4), Kohei Kiyoda, et al., *Denki Tsushin Gakkai Ronbunshi* Vol. J63-C, No. 2, P. 97 (1980), Yuji Harasaki, et al., *Kogyokaqakuzasshi* Vols. 66 and 78, P.188 (1963), Tadashi Tani, *Nippon Shashin Gakkaishi* Vol. 35, P. 208 (1972), et al.

Specific examples of the carbonium dyes, triphenylmethane dyes, xanthene eyes, and phthalein dyes are described in JP-B-51-452, JP-A-50-90334, JP-A-50-114227, JP-A-53-39130, JP-A-53-82353, U.S. Pat. Nos. 3,052,540 and 4,054,450, and JP-A-57-16456.

The polymethine dyes, such as oxonol dyes, merocyanine dyes, cyanine dyes, and rhodacyanine dyes, include those described in F. M. Harmmer, *The Cyanine Dyes and Related Compounds.* Specific examples are described in U.S. Pat. Nos. 3,047,384, 3,110,591, 3,121,008, 3,125,447, 3,128,179, 3,132,942, and 3,622,317, British Patents 1,226,892, 1,309,274, and 1,405,898, JP-B-48 7814 and JP-B-55-18892.

In addition, polymethine dyes capable of spectrally sensitizing in the longer wavelength region of 700 nm or more, i.e., from the near infrared region to the infrared region, include those described in JP-A-47-840, JP-A-47-44180, JP-B-51-41061, JP-A-49-5034, JP-A-49-45122, JP-A-57-46245, JP-A-56-35141, JP-A-57-157254, JP-A-61-26044, JP-A-61-27551, U.S. Pat. Nos. 3,619,154, and 4,175,956, and *Research Disclosure,* 216, pp. 117–118 (1982).

The photoreceptor of the present inventions particularly excellent in that the performance properties are not liable to variation even when combined with various kinds of sensitizing dyes.

If desired, the photoconductive layer may further contain various additives commonly employed in the electrophotographic photoconductive layer, such as chemical sensitizers. Examples of the additives include electron-accepting compounds (e.g., halogen, benzoquinone, chloranil, acid anhydrides, and organic carboxylic acids) described in the above-cited *Imaqinq,* Vol. 1973, No. 8, p. 12; and polyarylalkane compounds, hindered phenol compounds, and p-phenylenediamine compounds described in Hiroshi Komon, et al., *Saikin-no Kododen Zairyo to Kankotai no Kaihatsu Jitsuyoka,* Chaps. 4 to 6, Nippon Kagaku Joho K.K. (1986).

The amount of these additives is not particularly critical and usually ranges from 0.0001 to 2.0 parts by weight per 100 parts by weight of the photoconductive substance.

The photoconductive layer of the photoreceptor suitably has a thickness of from 1 to 100 μm, particularly from 10 to 50 μm.

In cases where the photoconductive layer functions as a generating layer in a laminated photoreceptor composed of a charge generating layer and a charge transport layer, the thickness of the charge generating layer suitably ranges from 0.01 to 1 μm, particularly from 0.05 to 0.5 μm.

If desired, an insulation layer may be set with a main object of protecting the photoreceptor and improving dark decay characteristics, endurance, etc. of the photoreceptor. The insulative layer used for the above object is relatively thin in its thickness, and the insulative layer used for a specific electrophotographic process is relatively thick in its thickness. In the latter case, the insulative layer has a thickness of from to 70 μm, especially a thickness of from 10 to 30 μm.

Charge transport materials in the above-described laminated photoreceptor include polyvinylcarbazole, oxazole dyes pyrazoline dyes, and triphenylmethane dyes, The thickness of the charge transport layer ranges from 5 to 40 μm, preferably from 10 to 30 μm.

Resins to be used in the insulating layer or charge transport later typically include thermoplastic and thermosetting resins, e.g., polystyrene resins, polyester resins, cellulose resins, polyether resins, vinyl chloride resins, vinyl acetate resins, vinyl cholride-vinyl acetate copolymer resins, polyacrylic acid resins, polyolefin resins, urethane resins, polyester resins, epoxy resins, melamine resins, and silicone resins.

The photoconductive layer according to the present invention can be provided on any known support. In general, a support for an electrophotographic photosensitive layer is preferably electrically conductive. Any of conventionally employed conductive supports may be utilized in this invention. Examples of usable conductive supports include a base, e.g., a metal sheet, paper, a plastic sheet, etc., having been rendered electrically conductive by, for example, impregnating with a low resistant substance; the above-described base with the back side thereof (opposite to the photosensitive layer side) being rendered conductive and having coated thereon at least one layer for the purpose of prevention of curling; the aforesaid supports having provided thereon a water-resistant adhesive layer; the aforesaid supports having provided thereon at least one precoat layer; and paper laminated with a plastic film on which aluminum, etc. is deposited.

Specific examples of conductive supports and materials for imparting conductivity are described in Yukio Sakamoto, *Denshishashin,* Vol. 14, No, 1, pp. 2-11 (1975), Hiroyuki Moriga, *Nyumon Tokushushi no Kaqaku,* Kobunshi Kankokai (1975), and M. F. Hoover, *J. Macromol. Sci. Chem.,* A-4(6), pp. 1327-1417 (1970).

The present invention is now illustrated in greater detail by way of the following Synthesis Examples and Examples, but it should be understood that the present invention is not deemed to be limited thereto.

SYNTHESIS EXAMPLE M-1

Synthesis of Macromonomer (M-1)

A mixed solution of 95 g of methyl methacrylate, 5 g of thioglycolic acid, and 200 g of toluene was heated to 75° C. in a nitrogen stream while stirring. One gram of 4,4'-azobis(4-cyanovaleric acid) (hereinafter abbreviated as ACV) was added to the solution, and the mixture was allowed to react for 8 hours. To the reaction solution were then added 8 g of glycidyl methacrylate, 1.0 g of N,N-dimethyldodecylamine, and 0.5 g of t-butyl-hydroquinone, and the mixture was stirred at 100° C. for 12 hours. After cooling, the reaction solution was poured into 2 l of methanol to re-precipitate to obtain 82 g of a white powder. The resulting polymer (M-1) had a weight average molecular weight (hereinafter referred to as Mw) of 8300.

SYNTHESIS EXAMPLE M-2

Synthesis of Macromonomer (M-2)

A mixed solution of 95 g of methyl methacrylate, 5 g of thioglycolic acid, and 200 g of toluene was heated to 70° C. in a nitrogen stream while stirring, and 1.5 g of 2.2'-azobis(isobutyronitrile) (hereinafter abbreviated as AIBN) was added to effect reaction for 8 hours. To the reaction solution were added 7.5 g of glycidyl methacrylate, 1.0 g of N,N-dimethyldodecylamine, and 0.8 g of t-butylhydroquinone, and the mixture was stirred at 100° C. for 12 hours. After cooling, the reaction solution was poured into 2 l of methanol to obtain 85 g of a colorless transparent viscous substance. The resulting polymer (M-2) had a Mw of 3500.

SYNTHESIS EXAMPLE M-3

Synthesis of Macromonomer (M-2)

A mixed solution of 94 g of butyl methacrylate, 6 g of 2-mercaptoethanol, and 200 g of toluene was heated to 70° C. in a nitrogen stream, and 1.2 g of AIBN was added thereto to effect reaction for 8 hours.

The reaction solution was cooled to 20° C. in a water bath, and 10.2 g of triethylamine was added thereto. To the mixture was further added dropwise 14.5 g of methacrylic acid chloride at 25° C. or lower while stirring After the dropwise addition, the stirring was continued for an additional one hour. Then, 0.5 g of t-butylhydroquinone was added, and the mixture was heated to 60° C., at which the mixture was stirred for 4 hours. After cooling, the reaction mixture was poured into 2 l of methanol to obtain 79 g of a colorless transparent viscous substance. The resulting polymer (M-3) had a Mw of 6000.

SYNTHESIS EXAMPLE M-4

Synthesis of Macromonomer (M-4)

A mixed solution of 95 g of ethyl methacrylate, 200 g of toluene was heated to 70° C. in a nitrogen stream, and 5 g of 2,2'-azobis(cyanoheptanol) was added thereto to effect reaction for 8 hours.

After cooling, the reaction solution was cooled to 20° C. in a water bath, and 1.0 g of triethylamine and 21 g of methacrylic anhydride were added thereto, followed by stirring for 1 hour and then at 60° C. for 6 hours.

The resulting reaction mixture was cooled and re-precipitated in 2l of methanol to recover 75 g of a colorless transparent viscous substance. The resulting polymer (M-4) had a Mw of 8500.

SYNTHESIS EXAMPLE M-5

Synthesis of Macromonomer (M-5)

A mixed solution of 93 g of benzyl methacrylate, 7 g of 3-mercaptopropionic acid, 170 g of toluene, and 30 g of isopropanol was heated to 70° C. in a nitrogen stream to prepare a uniform solution. Two grams of AIBN were added thereto, and the mixture was allowed to react for 8 hours. After cooling, the reaction mixture was re-precipitated in 2 l of methanol and then heated to 50° C. under reduced pressure to remove the solvent. The residual viscous substance was dissolved in 200 g of toluene, and 16 g of glycidyl methacrylate, 1.0 g of N,N-dimethyldodecyl methacrylate, and 1.0 g of t-butylhydroquinone were added to the solution, followed by stirring at 110° C. for 10 hours. The reaction solution was again re-precipitated in 2 l of methanol to recover a pale yellow viscous substance. The resulting polymer (M-5) had a Mw of 5200.

SYNTHESIS EXAMPLE M-6

Synthesis of Macromonomer (M-6)

A mixed solution of 95 g of propyl methacrylate, 5 g of thioglycolic acid, and 200 g of toluene was heated to 75° C. in a nitrogen stream while stirring, and 1.5 g of AIBN was added thereto to effect reaction for 8 hours. Then, 13 g of glycidyl methacrylate, 1.0 g of N,N-dimethyldodecylamine, and 1.0 g of t-butylhydroquinone were added to the reaction solution, followed by stirring at 110° C. for 10 hours. After cooling, the reaction solution was re-precipitated in 2 l of methanol to obtain 86 g of a white powder. The resulting polymer (M-6) had a Mw of 3600.

SYNTHESIS EXAMPLE M-7

Synthesis of Macromonomer (M-7)

A mixed solution of 40 g of methyl methacrylate, 54 g of ethyl methacrylate, 6 g of 2-mercaptoethylamine, 150 g of toluene, and 50 g of tetrahydrofuran was heated to 75° C. in a nitrogen stream while stirring, and 2.0 g of AIBN was added thereto to effect reaction for 8 hours. The reaction solution was cooled to 20° C. in a water bath, and 23 g of methacrylic anhydride was added dropwise to the solution taking care not to elevate the temperature above 25° C. After the dropwise addition, the stirring was continued for an additional one hour. Then, 0.5 g of 2,2'-methlenebis(6-t-butyl-p-cresol) was added to the reaction solution, followed by stirring at 40° C. for 3 hours. After cooling, the reaction solution was re-precipitated in 2 l of methanol to obtain 83 g of a viscous substance. The resulting polymer (M-7) had a Mw of 3400.

SYNTHESIS EXAMPLE M-8

Synthesis of Macromonomer (M-8)

A mixed solution of 95 g of methyl methacrylate, 150 g toluene, and 50 g of ethanol was heated to 75° C. in a nitrogen stream, and 5 g of ACV was added thereto to effect reaction for 8 hours. Then, 15 g of glycidyl acrylate, 1.0 g of N,N-dimethyldodecylamine, and 1.0 g of 2,2'-methylenebis(6-t-butyl-p-cresol}were added to the reaction solution, followed by stirring at 100° C. for 15 hours. After cooling, the reaction solution was re-precipitated in 2l of methanol to obtain 83 g of a transparent viscous substance. The resulting polymer (M-8) had Mw of 4800.

SYNTHESIS EXAMPLE M-9 TO 18

Synthesis of Macromonomer (M-9) to (M-18)

Macromonomers (M-9) to (M-18) were synthesized in the same manner as in Synthesis Example M-3, except for replacing methacrylic acid chloride with each of acid halides shown in Table 1. The resulting macromonomers had a Mw of about 6000.

TABLE 1

| Synthesis Example M-No. | Macromonomer | Acid Halide Kind | Acid Halide Amount (g) | Yield (g) |
|---|---|---|---|---|
| 9 | M-9 | $CH_2=CH-COCl$ | 13.5 | 75 |
| 10 | M-10 | $CH_3$<br>$CH=CH-COCl$ | 14.5 | 80 |
| 11 | M-11 | 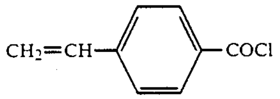 | 15.0 | 83 |
| 12 | M-12 | $CH_2=CH$<br>$COO(CH_2)_2COCl$ | 15.5 | 73 |
| 13 | M-13 | $CH_3$<br>$CH_2=C$<br>$COO(CH_2)_2OCO(CH_2)_2COCl$ | 18.0 | 75 |
| 14 | M-14 | $CH_3$<br>$CH_2=C$<br>$CONH(CH_2)_4COCl$ | 18.0 | 80 |
| 15 | M-15 | 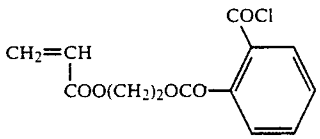 | 20.0 | 81 |
| 16 | M-16 | $CH_3$<br>$CH_2=C$ Br<br>$COOCH_2CHCH_2OCO(CH_2)_3COCl$ | 20.0 | 78 |
| 17 | M-17 | $CH_2=CH-CH_2$<br>$OCO(CH_2)_2COCl$ | 16.0 | 72 |
| 18 | M-18 | $CH_2=C-COCl$<br>$CH_2COOCH_3$ | 17.5 | 75 |

SYNTHESIS EXAMPLE M-19 TO 27

Synthesis of Macromonomer (M-19) to (M-27)

Macromonomers (M-19) to (M-27) were synthesized in the same manner as in Synthesis Example M-2, except for replacing methyl methacrylate with each of the monomers or monomer mixtures shown in Table 2.

TABLE 2

| Synthesis Example M-No. | Macro-Monomer | Monomer (Amount: g) | Mw |
|---|---|---|---|
| 19 | M-19 | ethyl methacrylate (95) | 2800 |
| 20 | M-20 | methyl methacrylate (60), butylmethacrylate (35) | 3200 |
| 21 | M-21 | butyl methacrylate (85), 2-hydro-xyethyl methacrylate (10) | 3300 |
| 22 | M-22 | ethyl methacrylate (75), styrene (20) | 2200 |
| 23 | M-23 | methyl methacrylate (80), methyl acrylate (15) | 2500 |
| 24 | M-24 | ethyl methacrylate (75), acrylonitrile (20) | 3000 |
| 25 | M-25 | propyl methacrylate (87), N,N-dimethylaminoethyl methacrylate (8) | 2200 |
| 26 | M-26 | butyl methacrylate (90), N-vinylpyrrolidone (5) | 3100 |
| 27 | M-27 | methyl methacrylate (89) dodecyl methacrylate (6) | 3000 |

SYNTHESIS EXAMPLE M-28 TO 32

Synthesis of Macromonomer (M-28) to (M-32)

Macromonomers (M-28) to (M-32) were synthesized in the same manner as in Synthesis Example M-2, except for replacing methyl methacrylate with each of the monomers shown in Table 3.

TABLE 3

| Synthesis Example M-No. | Macro-Monomer | Monomer | Mw |
|---|---|---|---|
| 28 | (M-28) | ethyl methacrylate | 3800 |
| 29 | (M-29) | butyl methacrylate | 4600 |
| 30 | (M-30) | benzyl methacrylate | 5000 |
| 31 | (M-31) | cyclohexyl methacrylate | 4800 |
| 32 | (M-32) | phenyl methacrylate | 4600 |

SYNTHESIS EXAMPLE 1

Synthesis of Resin (1)

A mixed solution of 70 g of ethyl methacrylate, 30 g of (M-2), 150 g of toluene, and 50 g of isopropanol was heated to 75° C. in a nitrogen stream, and 15 g of 4,4'-azobis (4-cyanovaleric acid) was added thereto to effect reaction for 10 hours. The resulting copolymer (1) had a Mw of $3.0\times 10^4$ and a glass transition point (Tg) of 70° C.

Composition of Resin (1):

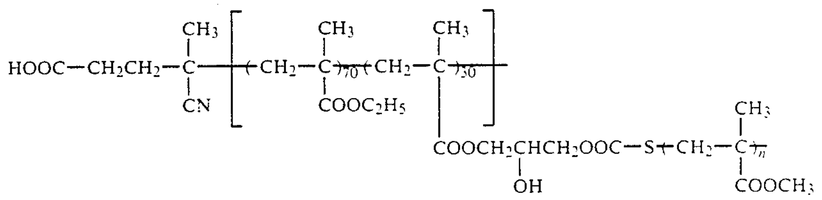

SYNTHESIS EXAMPLES 2 TO 9

Synthesis of Resin (2) to (9)

Resins were synthesized in the same manner as in Synthesis Example 1, except for replacing (M-2) with each of the macromonomers shown in Table 4.

TABLE 4

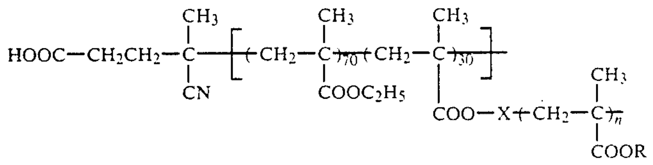

| Synthesis Example No. | Resin No. | Macromonomer | —X— | —R | $\overline{Mw}$ |
|---|---|---|---|---|---|
| 2 | 2 | M-3 | $-CH_2CH_2-S-$ | $-C_4H_9$ | $3.1\times 10^4$ |
| 3 | 3 | M-4 | 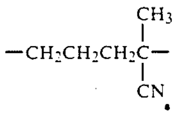 | $-C_2H_5$ | $2.8\times 10^4$ |
| 4 | 4 | M-5 | $-CH_2CH_2-S-$ | $-CH_2-C_6H_5$ | $2.7\times 10^4$ |
| 5 | 5 | M-6 | 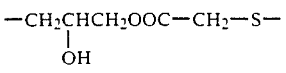 | $-C_3H_7$ | $3.0\times 10^4$ |

TABLE 4-continued

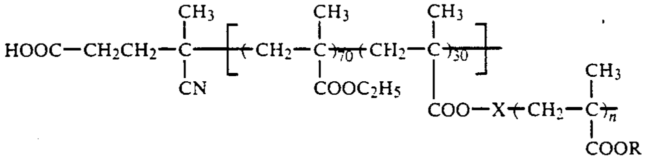

| Synthesis Example No. | Resin No. | Macromonomer | —X— | —R | $\overline{Mw}$ |
|---|---|---|---|---|---|
| 6 | 6 | M-28 | 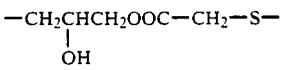 | $-C_2H_5$ | " |
| 7 | 7 | M-29 | " | $-C_4H_9$ | " |
| 8 | 8 | M-30 | " | $-CH_2C_6H_5$ | " |
| 9 | 9 | M-32 | " | $-C_6H_5$ | $3.1 \times 10^4$ |

SYNTHESIS EXAMPLE 10

Compositions Resin (10):

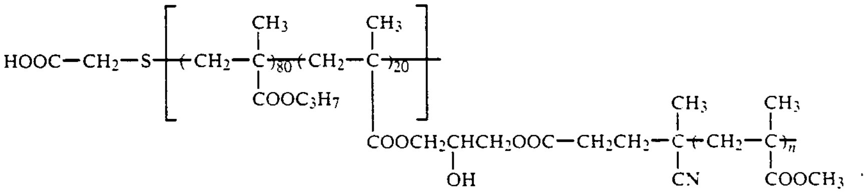

Synthesis of Resin (10)

A mixed solution of 80 g of propyl methacrylate, 20 g of (M-1), 20 g of thioglycolic acid, 100 g of toluene, and 50 g of isopropanol was heated to 70° C. in a nitrogen stream, and 1.0 g of AIBN was added thereto, followed by stirring for 4 hours. To the reaction solution was further added 0.5 g of AIBN, followed by stirring for 4 hours. The resulting polymer (10) had Mw of $6\times10^3$ and a Tg of 45° C.

SYNTHESIS EXAMPLES 11 TO 17

Synthesis of Resin (11) to (17)

Resins were synthesized in the same manner as in Synthesis Example 1, except for replacing thioglycolic acid with each of the mercaptan compounds shown in Table 5.

TABLE 5

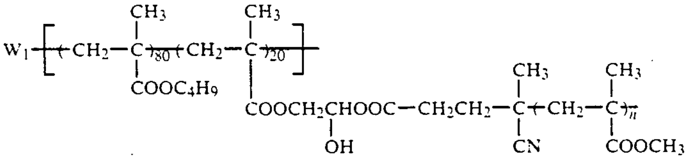

| Synthesis Example No. | Resin No. | Mercaptan Compound | $\overline{W}_1$ | $\overline{Mw}$ |
|---|---|---|---|---|
| 11 | 11 | 3-mercaptopropionic acid | $HOOC-CH_2CH_2-S-$ | $7.2 \times 10^3$ |
| 12 | 12 | 2-mercaptosuccinic acid | 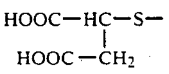 | $7.5 \times 10^3$ |
| 13 | 13 | thiosalicylic acid | 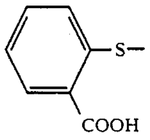 | $6 \times 10^3$ |
| 14 | 14 | 2-mercaptoethanesulfonic acid pyridine salt | 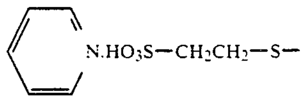 | $6.5 \times 10^3$ |
| 15 | 15 | $HSCH_2CH_2CONHCH_2COOH$ | $HOCH_2CNHCOCH_2CH_2-S-$ | $6.8 \times 10^3$ |
| 16 | 16 | 2-mercaptoethanol | $HO-CH_2CH_2-S-$ | $6 \times 10^3$ |

TABLE 5-continued

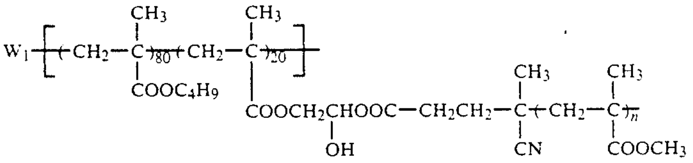

| Synthesis Example No. | Resin No. | Mercaptan Compound | $\overline{W_1}$ | $\overline{Mw}$ |
|---|---|---|---|---|
| 17 | 17 | 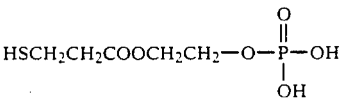 | 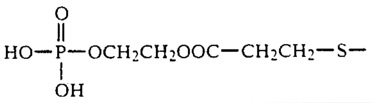 | $7.2 \times 10^3$ |

SYNTHESIS EXAMPLES 18 TO 24

Synthesis of Resin (18) to (24) Polymers were synthesized in the same manner as in Synthesis Example 1, except for replacing 4,4'-azobis(4,4'-cyanovaleric acid) with each of the azobis compound shown in Table 6.

TABLE 6

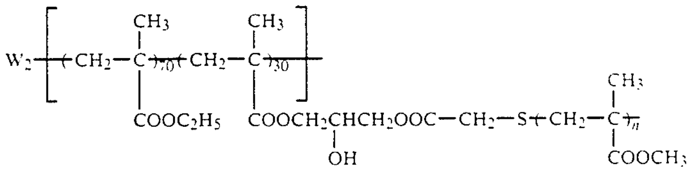

| Synthesis Example No. | Resin No. | Azobis Compound | $W_2$ | $\overline{Mw}$ |
|---|---|---|---|---|
| 18 | 18 | 2,2'-azobis(2-cyanopropanol) | 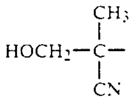 | $6.3 \times 10^4$ |
| 19 | 19 | 2,2'-azobis(2-cyanoheptanol) | 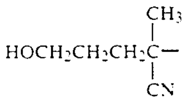 | $7.1 \times 10^4$ |
| 20 | 20 | 2,2'-azobis(2-methyl-N-[1,1-bis-(hydroxymethyl)-2-hydroxyethyl]-propionamide) | 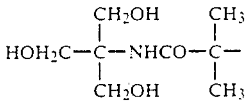 | $4 \times 10^4$ |
| 21 | 21 | 2,2'-azobis[2-methyl-N-(2-hydroxy-etyl)-propionamide] | 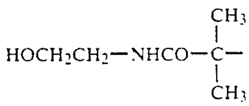 | $5 \times 10^4$ |
| 22 | 22 | 2,2'-azobis(2-methyl-N-[1,1-bis-(hydroxymethyl)ethyl]propionamide) | 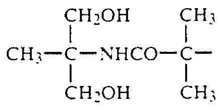 | $3.6 \times 10^4$ |
| 23 | 23 | 2,2'-azobis[2-(5-hydroxy-3,4,5,6-tetrahydropyrimidin-2-yl]propane | 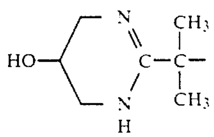 | $4.3 \times 10^4$ |

TABLE 6-continued

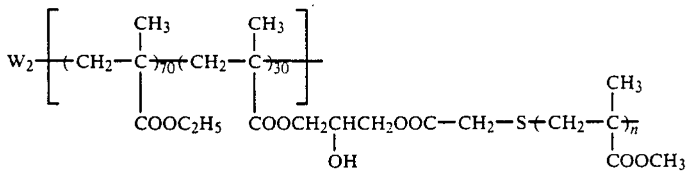

| Synthesis Example No. | Resin No. | Azobis Compound | $W_2$ | $\overline{Mw}$ |
|---|---|---|---|---|
| 24 | 24 | 2,2'-azobis(2-[1-(2-hydroxyethyl)-2-imidazolin-2-yl]-propane | 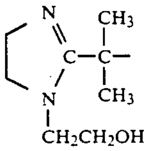 | $4 \times 10^4$ |

SYNTHESIS EXAMPLE 25

Synthesis of Resin (25)

A mixed solution of 70 g of ethyl methacrylate, 30 g of (M-2), 150 g of toluene, and 50 g of isopropanol was heated to 88° C. in a nitrogen stream, and 6 g of 4,4'-azobis (4-cyanovaleric acid) was added thereto to effect reaction for 10 hours. The resulting copolymer had Mw of $4.6 \times 10^3$ and a Tg of 63° C. The composition of Resin (25) was the same as the resin (1).

SYNTHESIS EXAMPLE 26 TO 30

Synthesis of Resin (26) to (30)

A mixed solution of 75 g of each of the monomers or monomer mixtures shown in Table 7 below, 25 g of (M-28), 150 g of toluene, and 50 g of ethanol was heated to 70° C. in a nitrogen stream, and 2 g of 4,4'-azobis(4-cyanovaleric acid) was added thereto to effect reaction for 10 hours to obtain each of the polymers of Table 7.

TABLE 7

| Synthesis Example M-No. | Macro-Monomer | Monomer | Mw |
|---|---|---|---|
| 26 | (26) | methyl methacrylate 75 g | $3.2 \times 10^4$ |
| 27 | (27) | ethyl methacrylate 75 g | $3.6 \times 10^4$ |
| 28 | (28) | methyl methacrylate 40 g<br>benzyl methacrylate 35 g | $3.5 \times 10^4$ |
| 29 | (29) | benzyl methacrylate 75 g | $3.7 \times 10^4$ |
| 30 | (30) | butyl methacrylate 60 g<br>styrene 15 g | $2.8 \times 10^4$ |

SYNTHESIS EXAMPLE 31

Synthesis of Resin (31)

A mixed solution of 60 g of ethyl methacrylate, 40 g of a macromonomer AN-6 (styene/acrylonitrile copolymer; produced by Toa Gosei Chemical Industry Co., Ltd.), 150 g of toluene, and 50 g of isopropanol was heated to 70° C., and 1.0 g of azobis(4-cyanovaleric acid) was added thereto to effect reaction for 8 hours. The resulting polymer had Mw of $10.5 \times 10^4$ and a Tg of 70° C.

SYNTHESIS EXAMPLES 32 TO 41

Synthesis of Resin (32) to (41)

Polymers were synthesized in the same manner as in Synthesis Example 31, except for replacing ethyl methacrylate and AN-6 with each of the monomers or monomer mixtures and each of the macromonomers shown in Table 8 below.

TABLE 8

| Synthesis Example No. | Resin No. | Monomer(s) (Amount: g) | Macromonomer (g) | Mw of Resin |
|---|---|---|---|---|
| 32 | 32 | methyl methacrylate (60) | (M-28) (40) | $11.2 \times 10^4$ |
| 33 | 33 | methyl methacrylate (60) | (M-29) (40) | $10.5 \times 10^4$ |
| 34 | 34 | ethyl methacrylate (70) | (M-30) (30) | $10 \times 10^4$ |
| 35 | 35 | butyl methacrylate (70) | AS-6 (produced by Toa Gosei Chemical) (30) | $9.5 \times 10^4$ |
| 36 | 36 | ethyl methacrylate (80) | (M-23) (20) | $9.8 \times 10^4$ |
| 37 | 37 | ethyl methacrylate (70) | (M-24) (30) | $9.7 \times 10^4$ |
| 38 | 38 | benzyl methacrylate (70) | (M-24) (30) | $10.3 \times 10^4$ |
| 39 | 39 | butyl methacrylate (55)<br>2-hydroxyethyl methacrylate (5) | (M-1) (40) | $9.8 \times 10^4$ |
| 40 | 40 | ethyl methacrylate (80) | (M-32) (20) | $9.8 \times 10^4$ |
| 41 | 41 | butyl methacrylate (85) | (M-21) (15) | $10 \times 10^4$ |

EXAMPLE 1

A mixture of 40 g (solid basis) of Resin (1) obtained in Synthesis Example 1, 200 g of zinc oxide, 0.018 g of a cyanine dye having the following formula, 0.05 g of phthalic anhydride, and 300 g of toluene was dispersed in a ball mill for 2 hours to prepare a coating composition for forming a photosensitive layer. The composition was coated on paper having been rendered electrically conductive with a wire bar to a dry coverage of 23 $g/m^2$ and dried at 110° C. for 30 seconds. The coating was allowed to stand in a dark place at 20° C. and 65% RH (relative humidity) for 24 hours to obtain an electrophotographic photoreceptor.

Cyanine Dye:

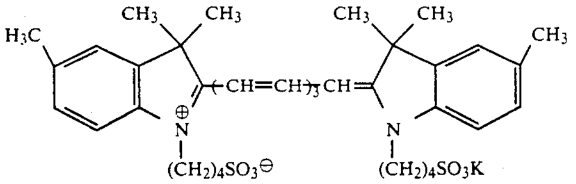

COMPARATIVE EXAMPLE A

An electrophotographic photoreceptor (designated as Sample A) was obtained in the same manner as in Example 1, except for replacing Resin (1) as used in Example 1 with 40 g (solid basis) of Resin (A-1) shown below.

Resin (A-1):

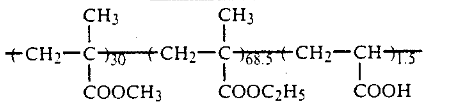

(polymerization ratio: by weight)
Mw: $2.8 \times 10^4$

Each of the photoreceptors obtained in Example 1 and Comparative Example A was evaluated for film properties in terms of surface smoothness and mechanical strength; electrostatic characteristics; and image forming performance in accordance with the following test methods. Further, an offset master plate was produced from each of the photoreceptors, and the oil-desensitivity of the photoconductive layer in terms of contact angle with water after oil-desensitization and printing durability were evaluated in accordance with the following test methods. The results obtained are shown in Table 9 below.

(1) Smoothness of Photoconductive Layer:

The smoothness (sec/cc) was measured by means of a Beck's smoothness tester manufactured by Kumagaya Riko K.K. under an air volume condition of 1 cc.

(2) Mechanical Strength of Photoconductive Layer:

The surface of the photoreceptor was repeatedly rubbed 1000 times with emery paper (#1000) under a load of 50 g/cm² by the use of a Heidon 14 Model surface testing machine (manufactured by Shinto Kagaku K.K.). After dusting, the abrasion loss of the photoconductive layer was measured to obtain a film retention (%).

(3) Electrostatic Characteristics:

The sample was charged by corona discharge to a voltage of −6 kV for 20 seconds in a dark room at 20° C. and 65% RH using a paper analyzer ("Paper Analyzer SP-428" manufactured by Kawaguchi Denki K.K.). After the elapse of 10 seconds from the end of the corona discharge, the surface potential $V_{10}$ was measured. The standing of the sample in dark was further continued for an additional 60 seconds, and the potential V7a was measured. The dark decay retention (DRR; %), i.e., percent retention of potential after dark decay for 60 seconds, was calculated from the equation:

$$DRR\ (\%) = (V_{70}/V_{10} \times 100$$

Separately, the sample was charged to −400 V by corona discharge and then exposed to monochromatic light having a wavelength of 780 nm, and the time required for decay of the surface potential $V_{10}$ to one-tenth was measured to obtain an exposure $E_{1/10}$ (erg/cm²).

(4) Image Forming Performance:

After the samples were allowed to stand for one day at 20° C. and 65% RH (hereinafter referred to as Condition I) or at 30° C. and 80% RH (hereinafter referred to as Condition II), each sample was charged to −5 kV and exposed to light emitted from a gallium-aluminum-arsenic semi-conductor laser (oscillation wavelength: 750 nm; output: 2.8 mW) at exposure amount of 64 erg/cm² (on the surface of the photoconductive layer) at a pitch of 25 μm and a scanning speed of 300 m/sec. The electrostatic latent image was developed with a liquid developer ("ELP-T" produced by Fuji Photo Film Co., Ltd.), followed by fixing. The reproduced image was visually evaluated for fog and image quality.

(5) Contact Angle With Water:

The sample was passed once through an etching processor using an oil-desensitizing solution ("ELP-E" produced by Fuji Photo Film Co., Ltd.) to render the surface of the photoconductive layer oil-desensitive. On the thus oil-desensitized surface was placed a drop of 2 μm of distilled water, and the contact angle formed between the surface and water was measured by a goniometer.

6) Printing Durability:

The sample was processed in the same manner as described in 4) above, and the surface of the photoconductive layer was subjected to oil-desensitization under the same conditions as in 5) above. The resulting lithographic printing plate was mounted on an offset printing machine ("Oliver Model 52", manufactured by Sakurai Seisakusho K.K.), and printing was carried out on fine paper. The number of prints obtained until background stains on non-image areas appeared or the quality of image areas was deteriorated was taken as printing durability. The larger the number of the prints, the higher the printing durability.

TABLE 9

| | Example 1 | Comparative Example A |
|---|---|---|
| Surface Smoothness (sec/cc) | 92 | 85 |
| Film strength (%) | 93 | 90 |
| $V_{10}$ (−V) | 545 | 460 |
| DRR (%) | 82 | 52 |
| $E_{1/10}$ (erg/cm²) | 42 | 90 |
| Image-Forming Performance: | | |
| Condition I | good | poor (unmeasurable $D_{max}$, cut of thin lines) |
| Condition II | good | very poor (unmeasurable $D_{max}$, cut of thin lines, letters non-reproduced) |
| Contact Angle with Water (°C.) | 13 | 18 to 22 (widely scattered) |
| Printing Durability | 10,000 prints or more | (cut of thin lines and background stains were observed from the start of printing) |

As can be seen from Table 9, the photoreceptor according to the present invention exhibited satisfactory surface smoothness and electrostatic characteristics. When it was used as an offset master plate precursor, the reproduced image was clear and free from background fog. The superiority of the photoreceptor of the invention seems to be attributed to sufficient adsorption of the binder resin onto the photoconductive substance and sufficient covering over the surface of the photoconductive particles with the binder resin. For the same reason, oil-desensitization of the offset master plate precursor with an oil-desensitizing solution sufficiently proceeded to render non-image areas sufficiently hydrophilic, as proved by such a small contact angle of 15° or less with water. On practical printing using the resulting master plate, no background stains were observed in the prints.

Sample A using the conventional random copolymer resin suffered considerable deterioration of electrostatic characteristics in DRR and $E_{1/10}$ and failed to form a satisfactory reproduced image.

The electrophotographic photoreceptor according to the present invention was thus proved satisfactory in all of surface smoothness, film strength, electrostatic characteristics, and printing suitability.

EXAMPLES 2 TO 17

An electrophotographic photoreceptor was prepared in the same manner as in Example 1, except for replacing Resin (1) with each of the resins shown in Table 10. The resulting photoreceptors were evaluated for various properties in the same manner as in Example 1. As a result, they had surface smoothness and film strength substantially equal to those of the sample of Example 1. Further, each of the photoreceptors was proved to be excellent in charging properties, dark charge retention, and photosensitivity and to provide a clear reproduced image free from background fog even when processed under a severe condition of high temperature and high humidity (i.e., 30° C., 80% RH).

TABLE 10

| Example No. | Resin No. | Example No. | Resin No. |
|---|---|---|---|
| 2 | (2) | 10 | (21) |
| 3 | (3) | 11 | (22) |
| 4 | (4) | 12 | (23) |
| 5 | (5) | 13 | (26) |
| 6 | (6) | 14 | (25) |
| 7 | (8) | 15 | (26) |
| 8 | (9) | 16 | (29) |
| 9 | (20) | 17 | (30) |

EXAMPLES 18 TO 26

An electrophotographic photoreceptor was prepared in the same manner as in Example 1, except for replacing Resin (1) as used in Example 1 with 40 g (solid basis) each of the resins shown in Table 11 below. Each of the resulting photoreceptors was evaluated for surface smoothness, film strength, electrostatic characteristics, and printing durability in the same manner as in Example 1. The results obtained are shown in Table 11.

TABLE 11

| Example No. | Resin No. | Surface Smoothness (sec/cc) | Film Strength (%) | $V_{10}$ (−V) | DRR (%) | $E_{1/10}$ (erg/cm$^2$) | Image-Forming Performance Condition II | Printing Durability |
|---|---|---|---|---|---|---|---|---|
| 18 | 10 | 100 | 65 | 560 | 85 | 35 | good | 3500 |
| 19 | 11 | 100 | 65 | 560 | 86 | 35 | good | " |
| 20 | 12 | 105 | 70 | 565 | 88 | 34 | good | " |
| 21 | 13 | 105 | 68 | 550 | 86 | 33 | good | " |
| 22 | 14 | 105 | 70 | 545 | 84 | 36 | good | " |
| 23 | 15 | 105 | 66 | 560 | 86 | 35 | good | " |
| 24 | 16 | 100 | 65 | 550 | 83 | 40 | good | " |
| 25 | 17 | 98 | 60 | 500 | 80 | 45 | good | 3000 |
| 26 | 25 | 100 | 65 | 555 | 85 | 36 | good | " |

It can be seen from Table 11 that any of the photoreceptors of the present invention is excellent in film strength and electrostatic characteristics and provides a clear reproduced image free from background fog even when processed under a high temperature and high humidity condition (30° C., 80% RH).

EXAMPLES 27 TO 38

An electrophotographic photoreceptor was prepared in the same manner as in Example 1, except for replacing Resin (1) with 40 g of a 15:85 (by weight) mixture of the resin[1]) and resin [2]) shown in Table 12. Each of the resulting photoreceptors was evaluated for surface smoothness, film strength, electrostatic characteristics, image forming performance, and printing durability in the same manner as in Example 1. As a result, all of them were found to have satisfactory surface smoothness. Other results of the evaluation are shown in Table 12.

TABLE 12

| Example No. | Resin(1) | Resin(2) | Film Strength (%) | $V_{10}$ (−V) | DRR (%) | $E_{1/10}$ (erg/cm$^2$) | Image-Forming Performance Condition II | Printing Durability |
|---|---|---|---|---|---|---|---|---|
| 27 | 10 | 31 | 93 | 550 | 83 | 38 | good | 10000 or more |
| 28 | " | 32 | 92 | 555 | 83 | 39 | " | 10000 or more |
| 29 | " | 34 | 93 | 560 | 82 | 36 | " | 10000 or more |
| 30 | " | 35 | 95 | 540 | 80 | 33 | " | 10000 or more |
| 31 | 11 | 38 | 92 | 545 | 83 | 37 | " | 10000 or more |
| 32 | " | 39 | 94 | 530 | 80 | 39 | " | 10000 or more |
| 33 | 12 | 31 | 94 | 555 | 84 | 35 | " | 10000 or more |

TABLE 12-continued

| Example No. | Resin(1) | Resin(2) | Film Strength (%) | $V_{10}$ (−V) | DRR (%) | $E_{1/10}$ (erg/cm²) | Image-Forming Performance Condition II | Printing Durability |
|---|---|---|---|---|---|---|---|---|
| 34 | " | 33 | 94 | 550 | 84 | 36 | " | 10000 or more |
| 35 | " | 40 | 94 | 555 | 83 | 34 | " | 10000 or more |
| 36 | 15 | 35 | 95 | 545 | 84 | 37 | " | 10000 or more |
| 37 | 17 | 31 | 91 | 525 | 80 | 41 | " | 10000 or more |
| 38 | " | 36 | 92 | 530 | 81 | 42 | " | 10000 or more |

As can be seen from Table 12, any of the photoreceptors according to the present invention exhibited satisfactory film strength and electrostatic characteristics and provided a clear reproduced image free from background fog even when processed under a high temperature and high humidity condition (30° C., 80% RH). An offset master produced from each of these photoreceptors provided more than 10,000 prints having a clear image free from background stains.

EXAMPLE 39

A mixed solution of 60 g of ethyl methacrylate, 30 g of (M-2), 10 g of allyl methacrylate, 3 g of thioglycolic acid, and 300 g of toluene was heated to 60° C. in a nitrogen stream, and 2 g of 2,2'-azobis(isovaleronitrile) (hereinafter abbreviated as ABVN) was added thereto, followed by stirring for 8 hours. The resulting copolymer resin (42) had a Mw of 8200 and a Tg of 43° C.

A mixture of 40 g (solid basis) of Resin (42), 200 g of zinc oxide, 0.018 g of the same cyanine dye as used in Example 1, 0.05 g of phthalic anhydride, and 280 g of toluene was dispersed in a ball mill for 2 hours. To the dispersion were added 10 g of allyl methacrylate and 0.1 g of ABVN, followed by dispersing for 10 hours to prepare a coating composition. The composition was coated on paper having been rendered conductive with a wire bar to a dry coverage of 23 g/m² and dried at 80° C. for 1 hours and then at 100° C. for 1 hour. The coating was allowed to stand in a dark place at 20° C. and 65% RH for 24 hours to obtain an electrophotographic photoreceptor.

Various performance properties of the resulting photoreceptor were evaluated in the same manner as in Example 1 and, as a result, it was found to have a surface smoothness of 93 sec/cc, a film strength of 80%, $V_{10}$ of −540 V, a DRR of 87%, and an $E_{1/10}$ of 40 erg/cm². Further, each photoreceptor provided a clear reproduced image on processing either under a normal temperature and normal humidity condition or under a high temperature and high humidity condition.

An offset master produced from the photoreceptor had a printing durability of 7,000 prints.

It can thus been revealed that use of a binder resin containing a heat-curable functional group brings about further improved electrophotographic characteristics and printing durability.

EXAMPLE 40

A mixed solution of 72 g of butyl methacrylate, 20 g of (M-8), 8 g of N-methoxymethylacrylamide, 200 g of toluene, and 50 g of isopropanol was heated to 85° C., and 2 g of 2,2'-azobis(4-cyanovaleric acid) was added thereto, followed by stirring for 7 hours.

The resulting copolymer resin (43) had a Mw of 23,000 and a Tg of 34° C.

A mixture of 40 g (solid basis) of Resin (43), 200 g of zinc oxide, 0.06 g of Rose Bengale, 0.15 g of phthalic anhydride, and 300 g of toluene was dispersed in a ball mill for 2 hours. The resulting photoconductive composition was coated on paper having been rendered conductive with a wire bar to a dry thickness of 20 g/m² and heated at 100° C. for 1 minute and then at 120° C. for 3 hours. Then, the resulting coated material was allowed to stand at 20° C. and 65% RH for 24 hours to obtain an electrophotographic photoreceptor. The resulting photoreceptor was evaluated in the same manner as in Example 1, with the following exceptions.

In the determination of Electrostatic characteristics, the method of Example I was repeated to obtain dark decay retention. Then, the photoconductive layer was charged to −400 V by corona discharge and then exposed to visible light (2.0 lux), and the time required for decreasing the surface potential ($V_{10}$) to one-tenth was measured to obtain an amount of exposure $E_{1/10}$ (lux.-sec).

In the formation of a reproduced image, the photoreceptor having been allowed to stand under Condition I or Condition II was processed by means of an automatic plate making machine "ELP-404V" (manufactured by Fuji Photo Film Co., Ltd.) and a developer "ELP-T" (produced by Fuji Photo Film Co., Ltd.).

The results obtained are as follows.

Surface smoothness: 88 sec/cc
Film Strength: 92%
$V_{10}$; −530 V
DRR: 85%
$E_{1/10}$: 9.5 lux.sec
Image-forming performance:
A clear image was obtained either under Condition I or under Condition II.
Contact angle with water: 12°
Printing durability:
10,000 prints free from background stain were obtained irrespective of the environmental condition during processing.

EXAMPLES 41 TO 50

Resins (44) to (53) were synthesized in the same manner as in Example 39, except for replacing (M-2) and allyl methacrylate with each of the macromonomers and difunctional monomers shown in Table 13, respectively.

TABLE 13

| Example No. | Binder Resin | Macromonomer | Difunctional Monomer | Mw of Resin |
|---|---|---|---|---|
| 41 | (44) | M-1 | 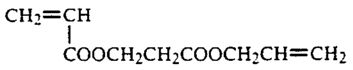 | 8,500 |
| 42 | (45) | M-9 | 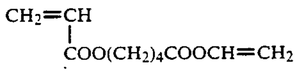 | 8,300 |
| 43 | (46) | M-12 | 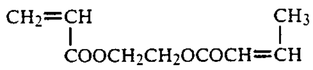 | 8,800 |
| 44 | (47) | M-22 | 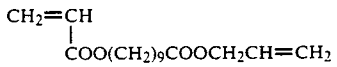 | 8,500 |
| 45 | (48) | M-25 | 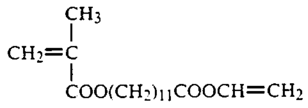 | 8,300 |
| 46 | (49) | M-28 | 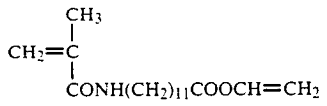 | 8,400 |
| 47 | (50) | M-29 | 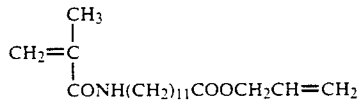 | 7,900 |
| 48 | (51) | M-30 | 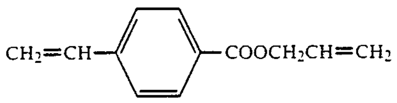 | 7,800 |
| 49 | (52) | M-31 | 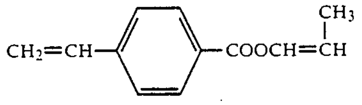 | 8,000 |
| 50 | (53) | M-32 | 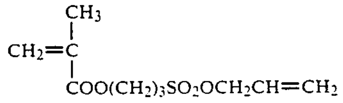 | 8,300 |

An electrophotographic photoreceptor was prepared in the same manner as in Example 39, except for using each of the resulting resins in place of Resin (42) as used in Example 39.

The resulting photoreceptor was evaluated in the same manner as in Example 40 and, as a result, proved to be excellent in film strength and electrostatic characteristics and to provide a clear reproduced image free from background fog even when processed under severe conditions of high temperature and high humidity (30° C., 80% RH). An offset master produced from each photoreceptor revealed satisfactory printing durability of from 6,000 to 7,000 prints.

While the invention has been described in detail and with reference to specific embodiments thereof, it will be apparent to one skilled in the art that various changes and modifications can be made therein without departing from the spirit and scope thereof.

What is claimed is:

1. An electrophtographic photoreceptor comprising a support having provided thereon at least one photoconductive layer containing at least inorganic photoconductive particles and a binder resin, wherein said binder resin comprises at least one copolymer resin comprising a monofunctional macromonomer (M) and a monomer (A), said monofunctional macromonomer (M) having a weight average molecular weight of from $1\times10^3$ to $2\times10^4$ and containing at least one polymerization component represented by formula (II-a) or (II-b):

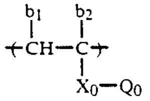
(II-a)

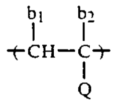
(II-b)

wherein $X_0$ represents —COO—, —OCO—, —$CH_2OCO$—, —$CH_2COO$—, —O—, —$SO_2$—, —CO—,

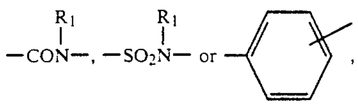

wherein $R_1$ represents a hydrogen atom or a hydrocarbon group; $Q_0$ represents an aliphatic group having from 1 to 18 carbon atoms or an aromatic group having from 6 to 12 carbon atoms, said carbon numbers not inclusive of substituents; $b_1$ and $b_2$, which may be the same or different, each represents a hydrogen atom, a halogen atom, a cyano group, a hydrocarbon group, —COO—Z or —COO—Z bonded via a hydrocarbon group, wherein Z represents a hydrogen atom or a substituted or unsubstituted hydrocarbon group; and Q represents —CN, $—CONH_2$ or

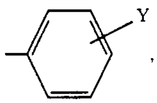

wherein Y represents a hydrogen atom, a halogen atom, an alkoxyl group or —COOZ′, wherein Z′ represents an alkyl group, an aralkyl group or an aryl group, with a polymerizable double bond-containing group represented by formula (I) being bonded to only one of the terminals of the main chain of said macromonomer:

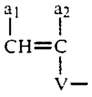

(I)

wherein V has the same meaning as $X_0$; and $a_1$ and $a_2$, which may be the same or different, each has the same meaning as $b_1$ and $b_2$, said monomer (A) being represented by formula (III):

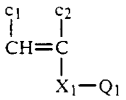

(III)

wherein $X_1$ has the same meaning as $X_0$; $Q_1$ has the same meaning as $Q_O$; and $c_1$ and $c_2$, which may be the same or different, has the same meaning as $b_1$ and $b_2$, and at least one polar group selected from $—PO_3H_2$, $—SO_3H$, —COOH, —OH, —SH, and

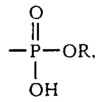

wherein R represents a hydrocarbon group, being bonded to only one of terminals of the main chain of said copolymer.

2. An electrophotographic photoreceptor as claimed in claim 1, wherein a weight ratio of said macromonomer (M) to the monomer of formula (III) is 1:99 to 90:10.

3. An electrophotographic photoreceptor as claimed in claim 1, wherein said binder resin has a weight average molecular weight of from $1\times10^3$ to $5\times10^5$.

4. An electrophotographic photoreceptor as claimed in claim 1, wherein said polar group is present in an amount of form 0.1 to 10 parts by weight per 100 parts by weight of the resin.

5. An electrophotographic photoreceptor as claimed in claim 1, wherein the binder resin is a combination of said copolymer resin having a weight average molecular weight of from $1\times10^3$ to $1\times10^4$ and said copolymer resin having a weight average molecular weight of $5\times10^4$ or more.

6. An electrophotographic photoreceptor as claimed in claim 1, wherein said copolymer resin further comprises a monomer (B) containing a heat-curable functional group.

7. An electrophotographic photoreceptor as claimed in claim 1, wherein said binder resin is used in an amount of from 10 to 100 parts by weight per 100 parts by weight of the inorganic photoconductive particles.

8. An electrophotographic photoreceptor as claimed in claim 1, wherein said inorganic photoconductive particles are zinc oxide particles.

9. An electrophotographic photoreceptor as claimed in claim 1, wherein said copolymer resin does not contain said polar group in the main chain of said copolymer other than said polar group bonded to only one of the terminals of the main chain of said copolymer.

* * * * *